United States Patent
Yang et al.

(10) Patent No.: US 12,132,329 B2
(45) Date of Patent: Oct. 29, 2024

(54) TO-BE-CHARGED DEVICE, WIRELESS CHARGING DEVICE, AND WIRELESS CHARGING METHOD

(71) Applicant: GUANGDONG OPPO MOBILE TELECOMMUNICATIONS CORP., LTD., Guangdong (CN)

(72) Inventors: Jun Yang, Guangdong (CN); Shiming Wan, Guangdong (CN); Jun Zhang, Guangdong (CN); Jialiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/743,370

(22) Filed: May 12, 2022

(65) Prior Publication Data
US 2022/0271571 A1 Aug. 25, 2022

Related U.S. Application Data

(63) Continuation of application No. PCT/CN2019/118611, filed on Nov. 14, 2019.

(51) Int. Cl.
*H02J 50/40* (2016.01)
*H02J 7/00* (2006.01)
(Continued)

(52) U.S. Cl.
CPC ........ *H02J 50/402* (2020.01); *H02J 7/00714* (2020.01); *H02J 7/007182* (2020.01);
(Continued)

(58) Field of Classification Search
CPC .............. H02J 50/402; H02J 7/00714; H02J 7/007182; H02J 7/007194; H02J 50/10;
(Continued)

(56) References Cited

U.S. PATENT DOCUMENTS

2014/0247052 A1  9/2014 Hada
2014/0266031 A1  9/2014 Sasaki
(Continued)

FOREIGN PATENT DOCUMENTS

CN  104143861 A  11/2014
CN  207968087    10/2018
(Continued)

OTHER PUBLICATIONS

CNIPA, First Office Action for CN Application No. 201980100124.8, Nov. 2, 2023.
WIPO, International Search Report and Written Opinion for PCT/CN2019/118611, Aug. 17, 2020.
EPO, European Search Report and Opinion for EP Application No. 19952343.2, Nov. 17, 2022.
(Continued)

*Primary Examiner* — Lincoln D Donovan
*Assistant Examiner* — Alex W Lam
(74) *Attorney, Agent, or Firm* — Hodgson Russ LLP

(57) ABSTRACT

Provided are a to-be-charged device, a wireless charging device, and a wireless charging method. The to-be-charged device includes a battery, at least two wireless receiver circuits, and a control circuit. Each of the at least two wireless receiver circuits is coupled to the battery, and is configured to receive an electromagnetic signal transmitted by a wireless charging device, and convert the electromagnetic signal into a charging current for charging the battery. The control circuit is coupled with each of the at least two wireless receiver circuits, and is configured to, in various charging stages or in different charging modes, control at least one of the at least two wireless receiver circuits to charge the battery.

20 Claims, 11 Drawing Sheets

(51) Int. Cl.
*H02J 50/10* (2016.01)
*H02J 50/80* (2016.01)
*H01M 10/44* (2006.01)

(52) U.S. Cl.
CPC ........ *H02J 7/007194* (2020.01); *H02J 50/10* (2016.02); *H02J 50/80* (2016.02); *H01M 10/44* (2013.01)

(58) Field of Classification Search
CPC ...... H02J 50/80; H02J 7/0071; H02J 2310/22; H02J 7/00034; H02J 50/12; H02J 50/70; H02J 50/50; H02J 5/005; H02J 50/20; H02J 7/025; H02J 7/007; H02J 7/00045; H02J 7/0042; H02J 7/0027; H02J 7/2434; H02J 50/60; H02J 50/90; H02J 50/40; H01M 10/44; H01M 2010/4271; H01M 2010/4278; H01M 10/425; H04B 5/0087; H04B 5/0037; H01F 38/14; H01F 27/24; H01F 27/36; H01F 27/28; H01F 2007/1888
See application file for complete search history.

(56) References Cited

U.S. PATENT DOCUMENTS

| | | | |
|---|---|---|---|
| 2015/0188358 A1* | 7/2015 | Jeong | H02J 50/80 320/108 |
| 2016/0105032 A1 | 4/2016 | Cho et al. | |
| 2019/0363590 A1* | 11/2019 | Jakubowski | H02J 50/005 |
| 2021/0119493 A1* | 4/2021 | Zhang | H01F 38/14 |

FOREIGN PATENT DOCUMENTS

| | | |
|---|---|---|
| CN | 108923509 A | 11/2018 |
| CN | 208623397 | 3/2019 |
| CN | 109760531 A | 5/2019 |
| CN | 209472406 | 10/2019 |
| EP | 3462564 A1 | 4/2019 |

OTHER PUBLICATIONS

EPO, Communication for EP Application No. 19952343.2, Jul. 8, 2024.
CNIPA, Second Office Action for CN Application No. 201980100124.8, Jul. 28, 2024.

* cited by examiner

10

| in various charging stages, the first wireless receiver circuit of the to-be-charged device receives an electromagnetic signal transmitted by the wireless charging device, and/or the second wireless receiver circuit receives an electromagnetic signal transmitted by the wireless charging device | S102 |

↓

| convert the electromagnetic signals into an output current for charging the battery in the to-be-charged device | S104 |

| in various charging stages, the first wireless receiver circuit and/or the second wireless receiver circuit of the to-be-charged device receives an electromagnetic signal transmitted by the wireless charging device | S102 |

↓

| convert the electromagnetic signals into an output current for charging the battery in the to-be-charged device | S104 |

↓

| transmit the charging information of the to-be-charged device to the wireless charging device | S106 |

| in various charging stages of the to-be-charged device, convert, through the first wireless transmitter circuit and/or the second wireless transmitter circuit of the wireless charging device, the electric energy input from the power supply device into an electromagnetic signal for transmission, so as to wirelessly charge the to-be-charged device | S302 |

S302 — in various charging stages of the to-be-charged device, convert, through the first wireless transmitter circuit and/or the second wireless transmitter circuit of the wireless charging device, the electric energy input from the power supply device into an electromagnetic signal for transmission, so as to wirelessly charge the to-be-charged device S304 — receive the charging information sent from the to-be-charged device S306 — based on the charging information, adjust the transmit power of the first wireless transmitter circuit and/or the transmit power of the second wireless transmitter circuit

S502 — in different charging modes, the first wireless receiver circuit and/or the second wireless receiver circuit of the to-be-charged device receives an electromagnetic signal transmitted by the wireless charging device S504 — convert the electromagnetic signals into an output current for charging the battery in the to-be-charged device

S502 — in different charging stages, the first wireless receiver circuit and/or the second wireless receiver circuit of the to-be-charged device receives an electromagnetic signal transmitted by the wireless charging device S504 — convert the electromagnetic signals into an output current for charging the battery in the to-be-charged device S506 — transmit the charging information of the to-be-charged device to the wireless charging device

| in different charging modes of the to-be-charged device, convert, through the first wireless transmitter circuit and/or the second wireless transmitter circuit of the wireless charging device, the electric energy input from the power supply device into an electromagnetic signal for transmission, so as to wirelessly charge the to-be-charged device | S702 |

| in different charging modes of the to-be-charged device, convert, through the first wireless transmitter circuit and/or the second wireless transmitter circuit of the wireless charging device, the electric energy input from the power supply device into an electromagnetic signal for transmission, so as to wirelessly charge the to-be-charged device | S702 |

↓ S704

| receive the charging information sent from the to-be-charged device |

↓ S706

| based on the charging information, adjust the transmit power of the first wireless transmitter circuit and/or the transmit power of the second wireless transmitter circuit |

FIG. 19

TO-BE-CHARGED DEVICE, WIRELESS CHARGING DEVICE, AND WIRELESS CHARGING METHOD

CROSS-REFERENCE TO RELATED APPLICATION(S)

This application is a continuation of International Application PCT/CN2019/118611, filed on Nov. 14, 2019, the entire disclosure of which is incorporated herein by reference.

TECHNICAL FIELD

The present disclosure relates to the technical field of wireless charging, and particularly to a to-be-charged device, a wireless charging device, and a wireless charging method.

BACKGROUND

With the popularity of wireless charging technology, more and more electronic devices (such as smart phones, and tablet computers) support the wireless charging function.

In the process of wireless charging, generally, a power adapter is connected to a wireless charging dock, and the wireless charging dock transmits the output power of the power adapter wirelessly (such as through electromagnetic signals or electromagnetic waves) to an electronic device, to wirelessly charge the electronic device.

However, with the increase of the battery capacity of the electronic device, the wireless charging rate is required to get faster, but the wireless charging method cannot meet the increasing demand for the wireless charging rate.

It should be noted that the information disclosed in this part is just for the purpose of facilitating understanding of the background of the disclosure, and therefore may contain information not belonging to the prior art that is already known to those of ordinary skill in the art.

SUMMARY

Embodiments of the present disclosure provide a to-be-charged device, a wireless charging device, and a wireless charging method.

Other features and advantages of the present disclosure will become apparent from the following detailed description, or be learned in part by practice of the present disclosure.

According to an aspect of the present disclosure, a to-be-charged device is provided. The to-be-charged device includes: a battery, at least two wireless receiver circuits, and a control circuit. Each of the at least two wireless receiver circuits is coupled to the battery, and is configured to receive an electromagnetic signal transmitted by a wireless charging device, and convert the electromagnetic signal into a charging current for charging the battery. The control circuit is coupled to each of the at least two wireless receiver circuits, and is configured to, in various charging stages, control at least one of the at least two wireless receiver circuits to charge the battery.

According to yet another aspect of the present disclosure, a wireless charging device is provided. The wireless charging device includes: a charging interface, at least two wireless transmitter circuits, and a control circuit. The charging interface is configured to receive an electric energy input from a power supply device. Each of the at least two wireless transmitter circuits is coupled to the charging interface, and is configured to convert the electric energy into an electromagnetic signal for transmission, and wirelessly charge a to-be-charged device. The control circuit is coupled to each of the at least two wireless transmitter circuits, and is configured to, in various charging stages of the to-be-charged device, control at least one of the at least two wireless transmitter circuits to transmit the electromagnetic signal.

According to yet another aspect of the present disclosure, a wireless charging method is provided, which is implemented by a to-be-charged device. In the method, in various charging stages, an electromagnetic signal transmitted by a wireless charging device is received through a first wireless receiver circuit of the to-be-charged device, and/or an electromagnetic signal transmitted by the wireless charging device is received through a second wireless receiver circuit of the to-be-charged device. The electromagnetic signals each are converted into a charging current for charging a battery of the to-be-charged device.

It should be understood that the foregoing general description and the following detailed description are exemplary and explanatory only, and are not restrictive of the present disclosure.

BRIEF DESCRIPTION OF THE DRAWINGS

The drawings, which are incorporated in and constitute a part of this specification, illustrate embodiments of the disclosure and serve to explain the principles of the disclosure together with the description. Obviously, the drawings in the following description illustrate only some embodiments of the present disclosure. For those of ordinary skill in the art, other drawings can also be obtained from these drawings without creative effort.

FIG. 12 is a flowchart of a wireless charging method provided by an exemplary embodiment of the present disclosure.

FIG. 13 is a flowchart of another wireless charging method provided by an exemplary embodiment of the present disclosure.

FIG. 14 is a flowchart of yet another wireless charging method provided by an exemplary embodiment of the present disclosure.

FIG. 15 is a flowchart of still another wireless charging method provided by an exemplary embodiment of the present disclosure.

FIG. 16 is a flowchart of still yet another wireless charging method provided by an exemplary embodiment of the present disclosure.

FIG. 17 is a flowchart of still yet another wireless charging method provided by an exemplary embodiment of the present disclosure.

FIG. 18 is a flowchart of still yet another wireless charging method provided by an exemplary embodiment of the present disclosure.

FIG. 19 is a flowchart of still yet another wireless charging method provided by an exemplary embodiment of the present disclosure.

DETAILED DESCRIPTION OF PREFERRED EMBODIMENTS

Figure 1:
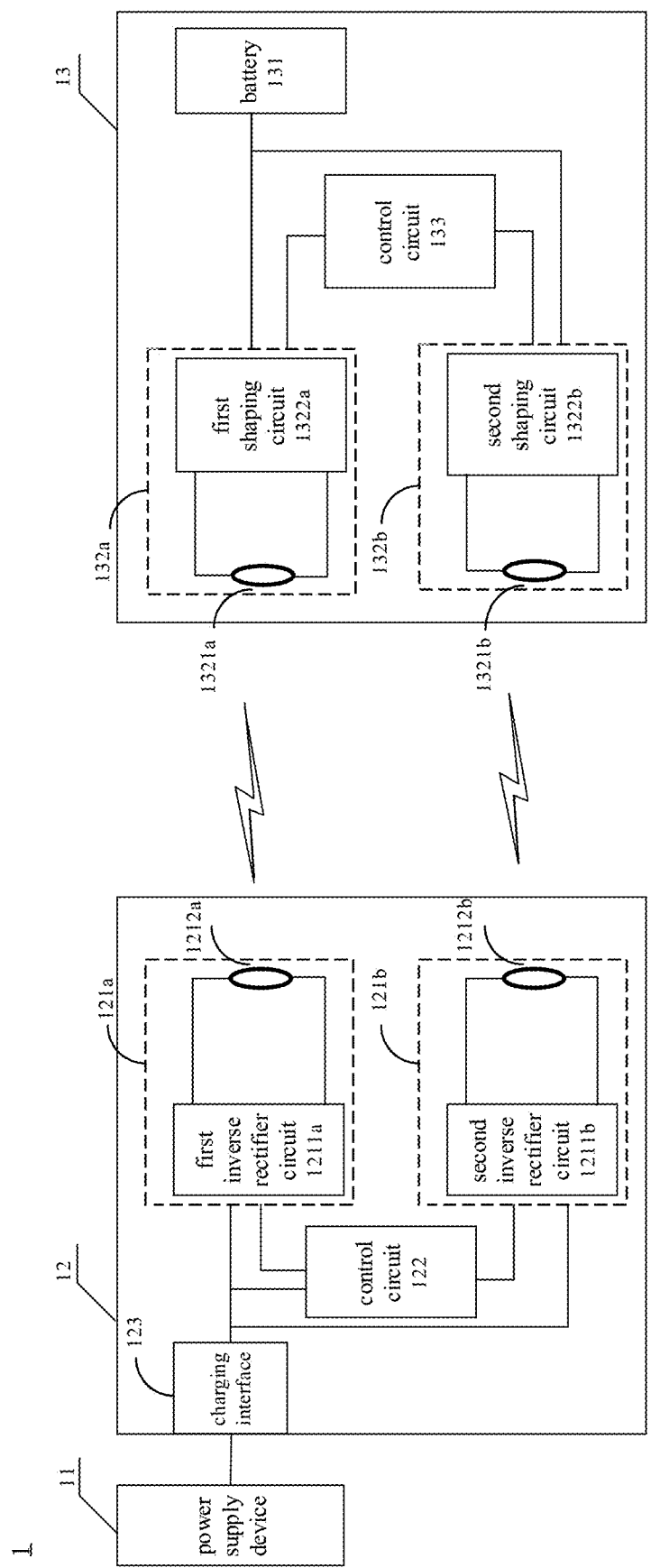
FIG. 1 is a schematic structural diagram of a wireless charging system provided by an exemplary embodiment of the present disclosure.

Exemplary embodiments will now be described more comprehensively with reference to the drawings. The exemplary embodiments, however, can be embodied in various forms and should not be construed as limiting examples set forth herein. Rather, these embodiments are provided to make this disclosure thorough and complete, and will fully convey the concept of the exemplary embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings denote the same or similar parts, and thus their repeated descriptions will be omitted. Some of the blocks shown in the figures are functional entities that do not necessarily correspond to physically or logically separate entities. These functional entities may be implemented in software, or in one or more hardware modules or integrated circuits, or in different networks and/or processor devices and/or microcontroller devices.

In the present disclosure, unless otherwise expressly specified and limited, the terms "connect", "couple" and other terms should be understood in a broad sense. For example, it may be an electrical connection or a communication connection; it may be directly connected, or indirectly connected. For those of ordinary skill in the art, the specific meanings of the above terms in the present disclosure can be understood according to specific situations.

In addition, the terms "first" and "second" are only used for descriptive purposes, and should not be construed as indicating or implying relative importance or implying the number of indicated technical features. The term "and/or", which describes the association relationship of the objects of interest, indicates that there are three relationships, for example, A and/or B can indicate a case where A exists alone, a case where B exists alone, and a case where both A and B exist. The symbol "/" generally indicates that the related objects are in an "or" relationship.

In the related art, the wireless charging is usually performed, through a single channel, between the wireless charging dock and the electronic device. However, due to the limitation of the receiver coil, the current coupled to the receiver coil cannot be further increased, and the power can only be increased by increasing the voltage on the rectifier circuit. But according to the requirements of the existing integrated circuit technology, if the voltage exceeds about 30V, the requirements for the technology and cost will be very high.

Therefore, the wireless charging system provided by the embodiments of the present disclosure can adopt multiple wireless charging channels for charging, so that the wireless charging power can be improved, and the wireless charging rate can thus be increased.

Hereinafter, the to-be-charged device, wireless charging device, system, and wireless charging method provided by the embodiments of the present disclosure will be described in detail through the following embodiments.

FIG. 1 is a schematic structural diagram of a wireless charging system provided by an exemplary embodiment of the present disclosure.

Referring to FIG. 1, the wireless charging system 1 includes: a power supply device 11, a wireless charging device 12 and a to-be-charged device 13.

The power supply device 11 may be, for example, a power adapter, a mobile power bank and other devices. The wireless charging device 12 may be, for example, a wireless charging dock.

After the power supply device 11 and the wireless charging device 12 are connected by a cable, the current output by the power supply device is transmitted to the wireless charging device 12.

The wireless charging device 12 includes: a first wireless transmitter circuit 121a, a second wireless transmitter circuit 121b, a control circuit 122 and a charging interface 123.

The wireless charging device 12 is connected to the power supply device 11 through the charging interface 123, and receives the electric energy output from the power supply device 11.

The charging interface 123 may be, for example, a USB 2.0 interface, a Micro USB interface or a USB TYPE-C interface. In some embodiments, the charging interface 123 may also be a lightning interface, or any other type of parallel port or serial port applicable for charging.

The wireless charging device 12 may also communicate with the power supply device 11 through the charging interface 123, without provision of an additional communication interface or other wireless communication modules, which can simplify the implementation of the wireless charging device 12. When the charging interface 123 is a USB interface, the wireless charging device 12 may communicate with the power supply device 11 based on data lines (e.g., D+ and/or D-lines) in the USB interface. For another example, when the charging interface 123 is a USB interface (such as a USB TYPE-C interface) that supports the Power Delivery (PD) communication protocol, the wireless charging device 12 may communicate with the power supply device 11 based on the PD communication protocol.

In addition, the wireless charging device 12 may also communicate with the power supply device 11 through other communication means other than the charging interface 123. For example, the wireless charging device 12 may communicate with the power supply device 11 wirelessly, for example through Near Field Communication (NFC), and Bluetooth communication.

Each of the first wireless transmitter circuit 121a and the second wireless transmitter circuit 121b is connected to the charging interface 123, and is configured to convert the electric energy output by the power supply device 11 into an electromagnetic signal (or electromagnetic wave) for transmission, so as to wirelessly charge the to-be-charged device 13. For example, each of the first wireless transmitter circuit 121a and the second wireless transmitter circuit 121b may include an inverse rectifier circuit and a transmitter coil (or a transmitting antenna). The inverse rectifier circuit is configured to convert the direct current output from the power supply device 11 into a high frequency alternating current, and the high frequency alternating current is converted, through the transmitter coil or the transmitting antenna, into an electromagnetic signal (or electromagnetic wave) for transmission.

In some embodiments, as shown in FIG. 1, the first wireless transmitter circuit 121a may include, for example, a first inverse rectifier circuit 1211a and a first transmitter coil 1212a. The second wireless transmitter circuit 121b includes a second inverse rectifier circuit 1211b and a second transmitter coil 1212b.

The control circuit 122 is connected with each of the first wireless transmitter circuit 121a and the second wireless transmitter circuit 121b, and is configured to, in various charging stages of the to-be-charged device 13, control the first wireless transmitter circuit 121a and the second wireless transmitter circuit 121b to transmit the above electromagnetic signals (or electromagnetic waves). That is, the first wireless transmitter circuit 121a and the second wireless transmitter circuit 121b are controlled to wirelessly charge the to-be-charged device 13 through the first wireless transmitter circuit 121a and/or the second wireless transmitter circuit 121b.

The control circuit 122 may be implemented by, for example, a Micro Control Unit (MCU).

The various charging stages of the battery during the charging process are described in the following.

In the process of charging a battery, the following charging stages may be included: a trickle charging stage, a constant current charging stage, and a constant voltage charging stage.

In the trickle charging stage, the battery which has been discharged to a preset voltage threshold is first pre-charged (i.e., performed with recovery charging), and the charging current in the trickle charging stage is generally one-tenth of the charging current in the constant current charging stage. Once the voltage of the battery rises above a trickle charging voltage threshold, the charging current is increased and the constant current charging stage is entered.

In the constant current charging stage, the battery is charged with a constant current, and the voltage of the battery rises rapidly. When the voltage of the battery reaches an expected voltage threshold (or cut-off voltage) of the battery, the constant voltage charging stage is entered.

In the constant voltage charging stage, the battery is charged at a constant voltage, and the charging current gradually decreases. When the charging current decreases to a preset current threshold (the current threshold is generally one-tenth of the charging current in the constant current charging stage or less; optionally, the current threshold may be tens of milliamps or less), the battery is considered to be fully charged.

In addition, after the battery is fully charged, due to the influence of self-discharge of the battery, a part of the current will be lost; and in this case, a supplementary charging stage is entered. In the supplementary charging stage, the charging current is small, which is just for the purpose of ensuring that the battery is fully charged.

It should be noted that the constant current charging stage mentioned in the embodiments of the present disclosure does not require that the charging current remains completely constant, for example, it may generally mean that the peak value or average value of the charging current remains unchanged for a period of time.

In practice, the constant current charging stage may also be implemented in a multi-stage constant current charging way.

The multi-stage constant current charging may include M constant current charging sub-stages (M is an integer not less than 2). The multi-stage constant current charging starts with the first constant current charging sub-stage that charges with a predetermined charging current, and the M constant current changing sub-stages of the multi-stage constant current charging are executed sequentially from the first constant current changing sub-stage to the M-th constant current changing sub-stage. When the previous constant current changing sub-stage in the constant current charging stage is transferred to the next constant current changing sub-stage, the amplitude of the changing current may be decreased. When the voltage of the battery reaches a charging voltage threshold corresponding to the current constant current charging sub-stage, the next constant current charging sub-stage is entered. The change of the charging current between two adjacent constant current charging sub-stages may be gradual, or may be a step-like jump change.

As can be seen from the above, during the process of charging the battery, in the constant current charging stage, the charging current is the largest, which makes the voltage of the battery increase rapidly.

The to-be-charged device 13 may be, for example, a terminal or an electronic device, which includes, but is not limited to, a device that receives/sends communication signals via a wired line (for example, via Public Switched Telephone Network (PSTN), Digital Subscriber Line (DSL), a digital cable or direct cable connection, and/or via another data connection/network) and/or via a wireless interface (for example, a wireless interface for cellular network, Wireless Local Area Network (WLAN), digital TV network such as Digital Video Broadcasting Handheld (DVB-H) network, satellite network, or Amplitude Modulation-Frequency Modulation (AM-FM) broadcast transmitter, and/or a wireless interface of another communication terminal). The communication terminal configured to communicate via a wireless interface may be referred to as a "wireless communication terminal", a "wireless terminal" and/or a "mobile terminal". Examples of the mobile terminal include, but are not limited to, satellites or cellular phones; Personal Communication System (PCS) terminals that can combine cellular radio phones with data processing, faxing and data communication capabilities; Personal digital assistants (PDA) that can incorporate a radio phone, a pager, Internet/intranet accessing, a web browser, a memo pad, calendar and/or a Global Positioning System (GPS) receiver; and conventional laptop and/or handheld receiver or other electronic device including a radio phone transceiver. In some embodiments, the device to-be-charged may refer to a mobile terminal device or a handheld terminal device, such as a mobile phone and a pad. In some embodiments, the device to-be-charged mentioned in the embodiments of this disclosure may refer to a chip system. In addition, the terminal may also include, but is not limited to, rechargeable electronic devices such as e-book readers, smart wearable devices, mobile power supplies (such as power banks, travel chargers), electronic cigarettes, wireless mice, wireless keyboards, wireless earphones, and Bluetooth speakers.

Referring to FIG. 1, the to-be-charged device 13 includes a battery 131, a first wireless receiver circuit 132a, a second wireless receiver circuit 132b and a control circuit 133.

The battery 131 may be, for example, a single battery or a single battery cell, or a lithium battery including multiple battery cells connected in series. Alternatively, the battery 131 may also include multiple battery units connected in series, and each of the battery units is a lithium battery including a single battery cell or multiple battery cells. When the battery 131 includes multiple battery cells or multiple battery units, the individual battery cells or battery units may be charged separately, or the multiple battery cells or the multiple battery units may be charged as a whole.

In the following, taking a case where the battery 131 includes two battery units connected in series and each of the battery units includes a single battery cell as an example, it is illustrated how the adopted multiple battery units connected in series not only enable the charging speed to be improved, but also enable the heat generated by the to-be-charged device to be reduced, when high-current charging is implemented.

For a to-be-charged device that includes a single battery unit, when a large charging current is adopted to charge the single battery unit, the heating of the to-be-charged device is serious. In order to ensure the charging speed of the to-be-charged device and alleviate the heating of the to-be-charged device during the charging process, the structure of the battery may be modified to adopt multiple battery units connected in series, and the multiple battery units are directly charged. That is, the voltage output by the adapter is directly applied to both ends of each of the battery units. Compared with the scheme of adopting the single battery unit (the capacity of the single battery unit before the modification is considered to be the same as the total capacity of multiple battery units connected in series after the modification), for achieving the same charging speed, the charging current applied to each of the multiple battery units is about 1/N of the charging current required by the single battery unit (N is the number of the battery units connected in series). In other words, on the premise of ensuring the same charging speed, the series connection of multiple battery units can greatly reduce the magnitude of the charging current, which in turn reduces the heat of the to-be-charged device generated during the charging process. Therefore, in order to improve the charging speed and reduce the heat of the to-be-charged device generated during the charging process, the to-be-charged device may use multiple battery units connected in series.

In addition, the battery 131 may also be, for example, a lithium battery including multiple battery cells connected in parallel, or may include multiple battery units connected in parallel, where each of the battery units is a lithium battery including a single battery cell or multiple battery cells.

Each of the first wireless receiver circuit 132a and the second wireless receiver circuit 132b is configured to receive the electromagnetic signal (or electromagnetic wave) transmitted by the wireless charging device 12, and convert the electromagnetic signal (or electromagnetic wave) into an direct current for output. For example, each of the first wireless receiver circuit 132a and the second wireless receiver circuit 132b may include a receiver coil (or a receiving antenna) and a shaping circuit connected with the receiver coil or the receiving antenna, where the shaping circuit includes a rectifier circuit and/or a filter circuit.

Exemplarily, it is illustrated by taking a case where the first wireless receiver circuit 132a is coupled to the first wireless transmitter circuit 121a and the second wireless receiver circuit 132b is coupled to the second wireless transmitter circuit 121b as an example, the first wireless receiver circuit 132a converts, through the receiver coil or receiving antenna, the electromagnetic signal (or electromagnetic wave) transmitted by the first wireless transmitter circuit 121a into an alternating current, and performs operations such as rectification and/or filtering on the alternating current through the shaping circuit, thereby converting the alternating current into a stable direct current for charging the battery 131. The second wireless receiver circuit 132b converts, through the receiver coil or the receiving antenna, the electromagnetic signal (or electromagnetic wave) transmitted by the second wireless transmitter circuit 121b into an alternating current, and performs operations such as rectification and/or filtering on the alternating current through the shaping circuit, thereby converting the alternating current into a stable direct current for charging the battery 131.

It should be noted that, during the charging process, the first wireless receiver circuit 132a may also be coupled with the second wireless transmitter circuit 121b, and the second wireless receiver circuit 132b may also be coupled with the first wireless transmitter circuit 121a. For example, when the user places the to-be-charged device 13 on the wireless charging device 12 for charging, if the user places the to-be-charged device 13 in such a manner that the first wireless receiver circuit 132a is relatively close to the second wireless transmitter circuit 121b and the second wireless receiver circuit 132b is relatively close to the first wireless transmitter circuit 121a, as described above, the first wireless receiver circuit 132a may also be coupled with the second wireless transmitter circuit 121b, and the second wireless receiver circuit 132b may also be coupled with the first wireless transmitter circuit 121a. That is, in practical applications, the coupling relationship between the two wireless transmitter circuits and the two wireless receiver circuits is not limited, for example, the coupling may be performed according to their positional relationships.

It should be noted that, in the embodiments of the present disclosure, the specific form of the shaping circuit and the forms of the output voltage and output current of the first wireless receiver circuit 132a and the second wireless receiver circuit 132b, that are obtained after being shaped by the shaping circuit, are not limited.

In some embodiments, the shaping circuit may include a rectifier circuit and a filter circuit. Each of the output voltage of the first wireless receiver circuit 132a and the output voltage of the second wireless receiver circuit 132b may be a stable voltage obtained after filtering.

In some embodiments, the shaping circuit may include only the rectifier circuit. Each of the output voltage of the first wireless receiver circuit 132a and the output voltage of the second wireless receiver circuit 132b may be a pulsating voltage obtained after rectification, and the pulsating voltage is directly applied to both ends of the battery 131 to charge the battery 131. It can be understood that each of the output current of the first wireless receiver circuit 132a and the output current of the second wireless receiver circuit 132b may charge the battery 131 in an intermittent manner, and the cycle of each of the output current of the first wireless receiver circuit 132a and the output current of the second wireless receiver circuit 132b may change with the frequency of the AC power input to the wireless charging system 1, for example, change with the frequency of the AC power grid. For example, the frequency corresponding to the cycle of each of the output current of the first wireless receiver circuit 132a and the output current of the second wireless receiver circuit 132b is an integer multiple or the reciprocal of the frequency of the grid. In addition, when the output current of the first wireless receiver circuit 132a and the output current of the second wireless receiver circuit 132b may charge the battery 131 in an intermittent manner, the current waveform corresponding to each of the output current of the first wireless receiver circuit 132a and the output current of the second wireless receiver circuit 132b may be composed of one or a group of pulses synchronized with the grid. The magnitude of the pulsating voltage/current changes periodically. Compared with the constant direct current, the pulsating voltage/current enables the lithium precipitation of the lithium battery to be reduced, thereby improving the service life of the battery. In addition, this helps to reduce the polarization effect of the battery, improve the charging speed, and reduce the heat generated by the battery, thereby ensuring the safety and reliability of the to-be-charged device during the charging process.

In some embodiments, as shown in FIG. 1, the first wireless receiver circuit 132a may include, for example, a first receiver coil 1321a and a first shaping circuit 1322a. The second wireless receiver circuit 132b may include a second receiver coil 1321b and a second shaping circuit 1322b.

In some embodiments, the first receiver coil 1321a and the second receiver coil 1321b are arranged in a same plane of the to-be-charged device 13. For example, the two receiver coils may be arranged along a long side of the to-be-charged device 13, or may also be arranged along a short side of the to-be-charged device 13. Such arrangement is more conducive to the heat dissipation of the to-be-charged device 13, and has a better effect of limiting the temperature.

The control circuit 133 may be implemented by, for example, an independent MCU, or may also be implemented by an application processor (AP) inside the to-be-charged device 13.

The control circuit 133 is connected with each of the first wireless receiver circuit 132a and the second wireless receiver circuit 132b, and is configured to, in various charging stages, control the first wireless receiver circuit 132a and/or the second wireless receiver circuit 132b to charge the battery 131. That is, the first wireless receiver circuit 132a and the second wireless receiver circuit 132b are controlled in such as manner that the battery 131 is charged through the first wireless receiver circuit 132a and/or the second wireless receiver circuit 132b.

Figure 2:
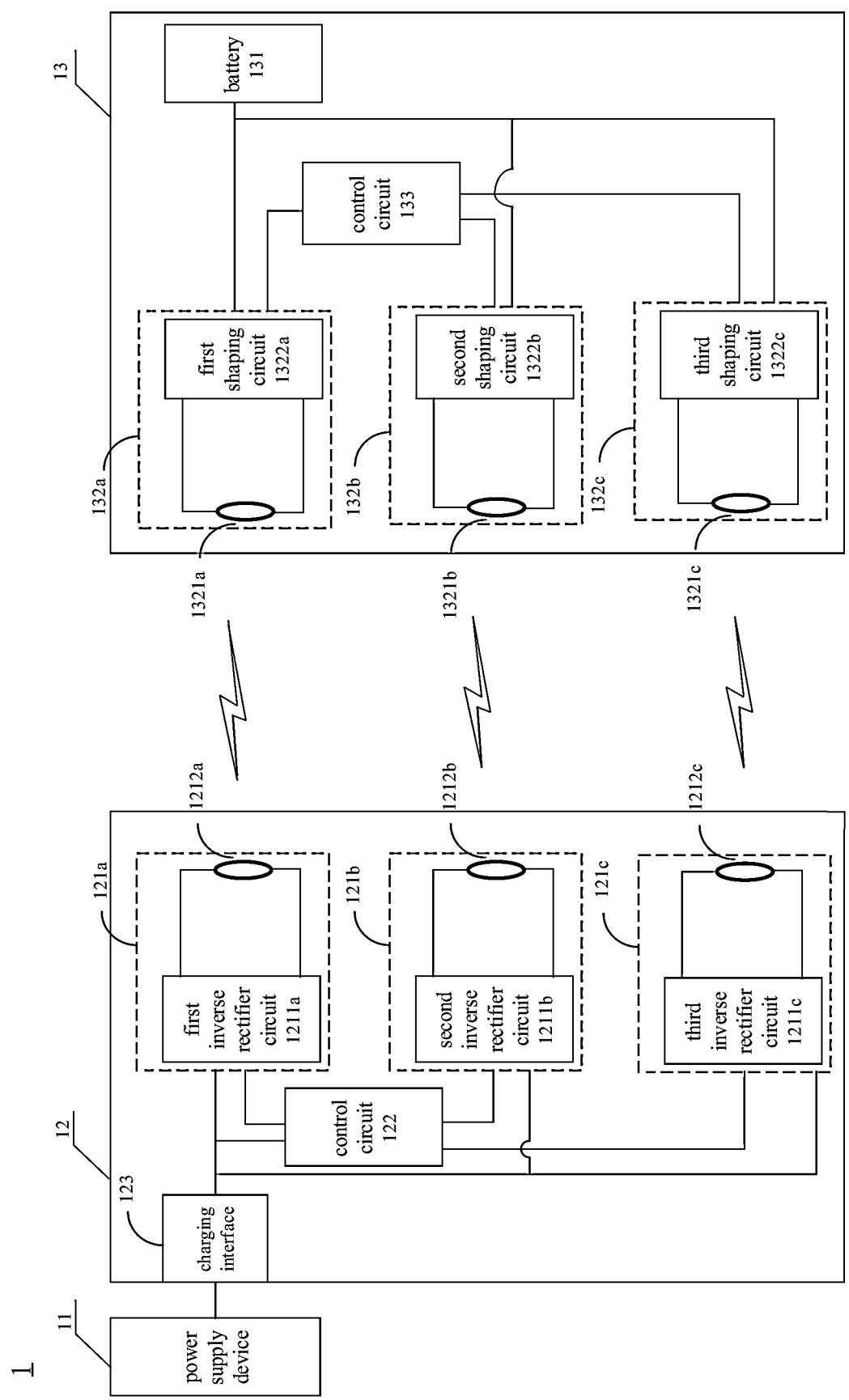
FIG. 2 is a schematic structural diagram of another wireless charging system provided by an exemplary embodiment of the present disclosure.

It should be understood by those skilled in the art that, although it is illustrated by taking a case where the wireless charging device 12 include two wireless transmitter circuits and the to-be-charged device 13 includes two wireless receiver circuits in FIG. 1 as an example, the wireless charging device 12 may also include more wireless transmitter circuits (such as three wireless transmitter circuits in FIG. 2), and correspondingly, the to-be-charged device 13 may also include more wireless receiver circuits (for example, three wireless receiver circuits in FIG. 2). Correspondingly, the control circuit 133 is configured to control at least one of the at least two wireless receiver circuits to charge the battery 131.

FIG. 2 is a schematic structural diagram of another wireless charging system provided by an exemplary embodiment of the present disclosure.

The wireless charging device 12 in FIG. 2 may further include a third wireless transmitter circuit 121c, and the to-be-charged device 13 further includes a third wireless receiver circuit 132c.

The control circuit 122 of the wireless charging device 12 is further configured to, in various charging stages, control the first wireless transmitter circuit 121a, the second wireless transmitter circuit 121b and the third wireless transmitter circuit 121c, so as to transmit electromagnetic signals through a part or all of the first wireless transmitter circuit 121a, the second wireless transmitter circuit 121b and the third wireless transmitter circuit 121c.

The control circuit 133 of the to-be-charged device 13 is further configured to, in various charging stages, control the first wireless receiver circuit 132a, the second wireless receiver circuit 132b and the third wireless receiver circuit 132c, so as to charge the battery 131 through a part or all of the first wireless receiver circuit 132a, the second wireless receiver circuit 132b and the third wireless receiver circuit 132c.

It should be noted that, although terms "first", "second" and "third" and the like are used to distinguish different wireless transmitter circuits and wireless receiver circuits, in the actual charging process, the coupling between various wireless transmitter circuits and wireless receiver circuits is not limited by these terms "first", "second" and "third". For example, as described above, the coupling may be performed according to the distances between the wireless transmitter circuits and the wireless receiver circuits, to accordingly form one or more wireless charging channels. Those skilled in the art should understand that the wireless charging channel is a wireless virtual channel constituted by electromagnetic waves or electromagnetic signals.

As described above, the wireless charging device provided by the embodiments of the present disclosure includes multiple wireless transmitter circuits, and the to-be-charged device includes multiple wireless receiver circuits, so that multiple wireless charging channels can be provided when the wireless changing device wirelessly charges the to-be-charged device. In various charging stages, when the multiple wireless charging channels are used for the wireless charging, the wireless charging power can be greatly improved (for example, when two wireless charging channels are used, the charging power can be almost doubled; when three wireless charging are used, the charging power can be almost three times that of using a single channel, and so on), thereby speeding up the charging of the battery.

As can be seen from the above, during the process of charging the battery, the charging current in the constant current charging stage is the largest, which makes the voltage of the battery increase rapidly. In order to further increase the speed of charging the battery, for example, multiple wireless charging channels, such as the two wireless charging channels shown in FIG. 1 or the three wireless charging channels shown in FIG. 2, may be used to charge the battery 131 in the constant current charging stage. That is, the various wireless transmitter circuits are controlled by the control circuit 122 in the wireless charging device 12, and the various wireless receiver circuits are controlled by the control circuit 133 in the to-be-charged device 13, so as to form multiple wireless charging channels for charging the battery 131.

In addition, in the trickle charging stage and/or the constant voltage charging stage, due to the small charging current required, it is still possible to use one single channel for charging, such as one of the two wireless charging channels shown in FIG. 1 or one of the three wireless charging channels shown in FIG. 2. Alternatively, in the trickle charging stage and/or the constant voltage charging stage, multiple wireless charging channels may also be used for charging, such as the two wireless charging channels shown in FIG. 1 or two or three wireless charging channels shown in FIG. 2. That is, the various wireless transmitter circuits are controlled by the control circuit 122 in the wireless charging device 12, and the various wireless receiver circuits are controlled by the control circuit 133 in the to-be-charged device 13, so as to form one or more wireless charging channels for charging the battery 131. When only a part of the wireless charging channels is used, the unused wireless transmitter circuit(s) may be turned off by the control circuit 122 and the unused wireless receiver circuit(s) may be turned off by the control circuit 133, to form the part of the wireless charging channels.

It should be understood by those skilled in the art that, although it is illustrated in the above by taking the trickle charging stage, the constant current charging stage and the constant voltage charging stage as an example, the "various charging stages" described in the present disclosure are not limited thereto. For example, in the process of charging the battery 131, only the trickle charging stage and the constant current charging stage may be included, but the constant voltage charging stage is not included; alternatively, only the constant current charging stage and the constant voltage charging stage may be included, but the trickle current charging stage is not included. In addition, other charging stages are also possible.

Figure 11:
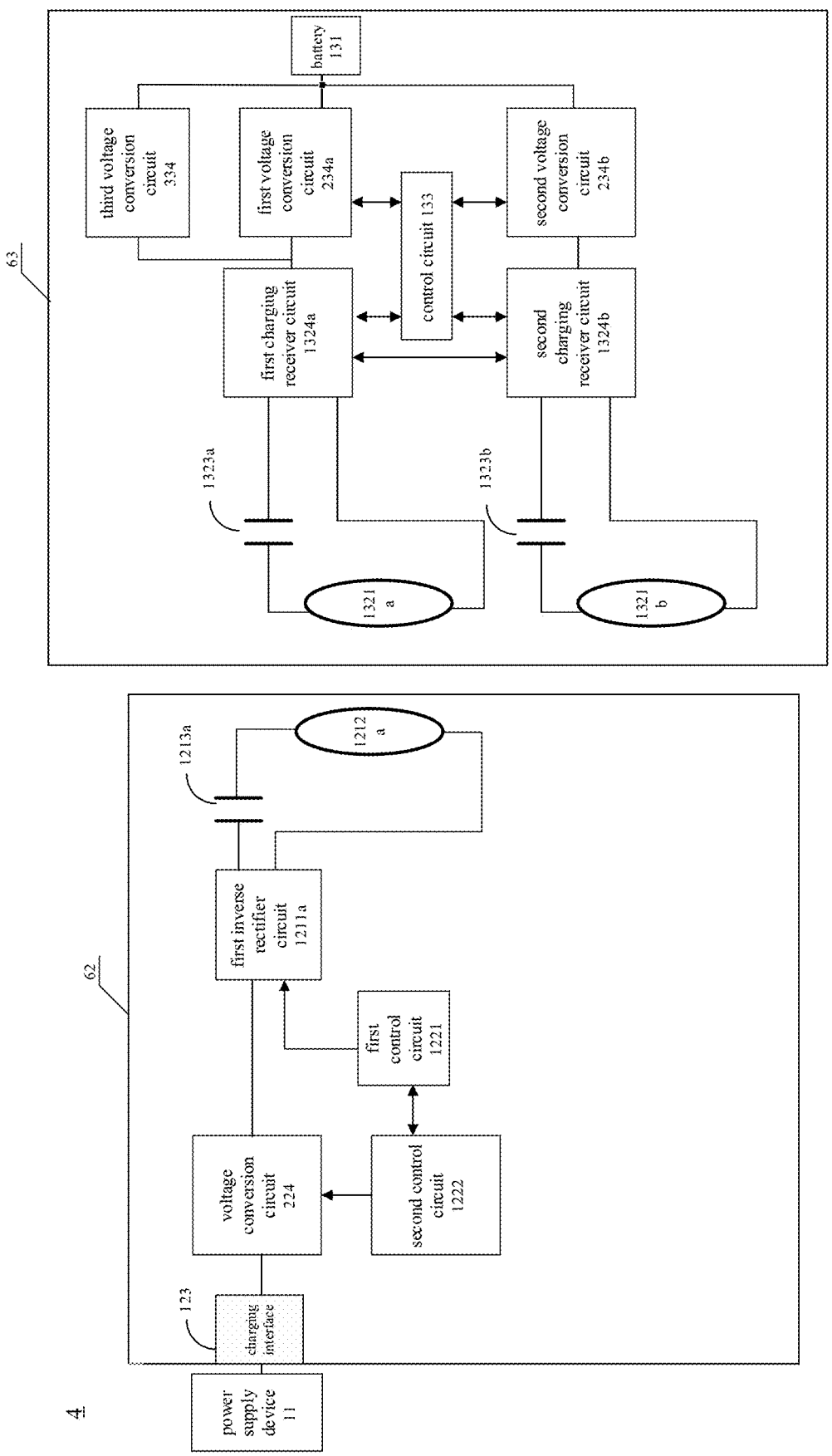
FIG. 11 is a schematic structural diagram of still yet another wireless charging system provided by an exemplary embodiment of the present disclosure.

In addition, in some embodiments, when the to-be-charged device 13 is charged, it may be placed on a wireless charging device that includes only one wireless transmitter circuit, where the specific structure thereof may be seen in FIG. 11. The control circuit in the to-be-charged device 13 may also be configured to detect the number of the wireless transmitter circuits included in the wireless charging device. For example, the number of the wireless transmitter circuits included in the wireless charging device may be detected by controlling the first wireless receiver circuit 132a and/or the second wireless receiver circuit 132b to perform wireless communication with the opposite wireless transmitter circuit(s). When it is detected that the wireless charging device includes only one wireless transmitter circuit, the control circuit 133 may also be configured to control the first wireless receiver circuit 132a or the second wireless receiver circuit 132b to be used to charge the battery 131. For example, when the first wireless receiver circuit 132a is used, the wireless charging channel including the second wireless receiver circuit 132b is correspondingly disconnected; alternatively, when the second wireless receiver circuit 132b is used, the wireless charging channel including the first wireless receiver circuit 132a is correspondingly disconnected.

It is illustrated in the above how the to-be-charged device 13 performs the wireless charging when the number of coils of the to-be-charged device and the number of coils of the wireless charging device do not match, by taking a case where the to-be-charged device 13 includes two wireless receiver circuits and the wireless charging device includes one wireless transmitter circuit. However, those skilled in the art should understand that it is also possible that the to-be-charged device 13 includes three wireless receiver circuits, and the wireless charging device includes two wireless transmitter circuits. In this case, the number of the wireless transmitter circuits included in the wireless charging device can still be detected, under control of the control circuit 133 of the to-be-charged device 13. When it is detected that the number of the wireless receiver circuits does not match the number of the wireless transmitter circuits, a part of the wireless receiver circuits of the to-be-charged device 13 is used to form at least one wireless charging channel with the wireless transmitter circuits of the wireless charging device, for performing the wireless charging.

The charging modes of the to-be-charged device will be described below.

The to-be-charged device 13 may support a first charging mode and a wireless charging mode. The charging power provided to the battery 133 in the first charging mode is higher than the charging power provided to the battery 133 in the second charging mode.

The first charging mode may be a fast charging mode. The fast charging mode may refer to a charging mode in which the transmit power of the wireless charging device 12 is relatively large (usually greater than or equal to 15 W).

The second charging mode may be a common charging mode. The common charging mode may refer to a charging mode in which the transmit power of the wireless charging device 12 is relatively small (usually less than 15 W, and the commonly used transmit power is 5 W or 10 W). For example, it may be a conventional wireless charging mode based on the QI standard, the PMA standard or the A4WP standard.

It usually takes several hours to fully charge a large capacity battery (such as a battery having a capacity of 3000 mAh) in the common charging mode. Compared with the common charging mode, in the fast charging mode, the charging time required to fully charge a battery of the same capacity can be significantly shortened and the charging speed is faster.

From the above, in the first charging mode, the charging current is the largest, which makes the voltage of the battery increase rapidly. In order to further increase the speed of charging the battery, for example, in the first charging mode, multiple wireless charging channels, such as the two wireless charging channels shown in FIG. 1 or the three wireless charging channels shown in FIG. 2, can be used to charge the battery 131. That is, the various wireless transmitter circuits are controlled by the control circuit 122 in the wireless charging device 12, and the various wireless receiver circuits are controlled by the control circuit 133 in the to-be-charged device 13, so as to form multiple wireless charging channels for charging the battery 131.

In addition, in the second charging mode, due to the small charging current required, it is still possible to use one single channel for charging, such as one of the two wireless charging channels shown in FIG. 1 or one of the three wireless charging channels shown in FIG. 2. Alternatively, in the second charging mode, multiple wireless charging channels may also be used for charging, such as the two wireless charging channels shown in FIG. 1 or two or three wireless charging channels shown in FIG. 2. That is, the various wireless transmitter circuits are controlled by the control circuit 122 in the wireless charging device 12, and the various wireless receiver circuits are controlled by the control circuit 133 in the to-be-charged device 13, so as to form one or more wireless charging channels for charging the battery 131. When only a part of the wireless charging channels is used, the unused wireless transmitter circuit(s) may be turned off by the control circuit 122 and the unused wireless receiver circuit(s) may be turned off by the control circuit 133, to form the part of the wireless charging channels.

Figure 3:
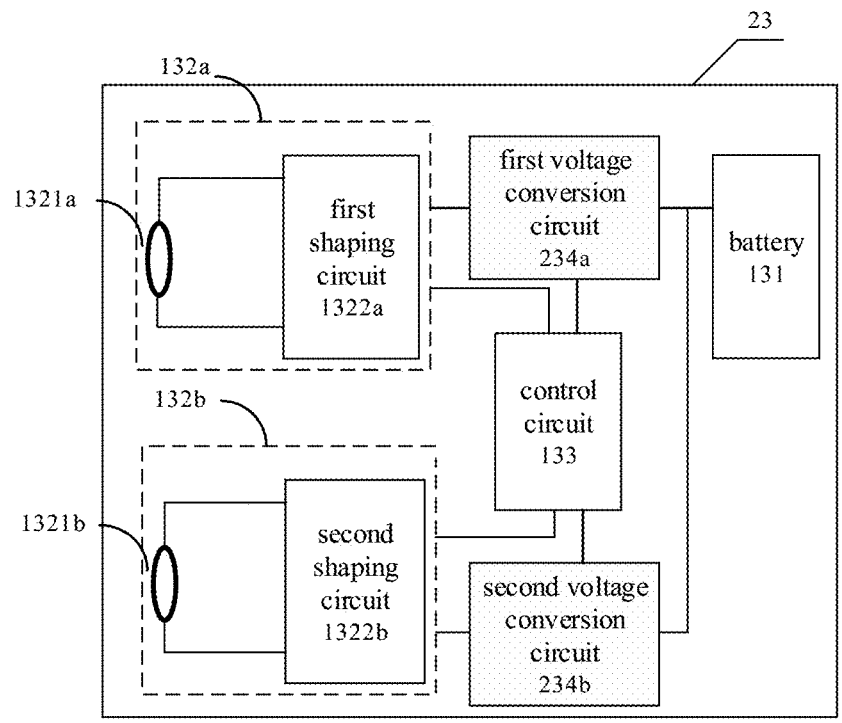
FIG. 3 is a schematic structural diagram of a to-be-charged device provided by an exemplary embodiment of the present disclosure.

FIG. 3 is a schematic structural diagram of a to-be-charged device provided by an exemplary embodiment of the present disclosure.

It should be noted that, although it is illustrated by taking a case where the to-be-charged device 23 in FIG. 3 includes two wireless receiver circuits as an example to simplify the drawings, as described above, it may also include multiple wireless receiver circuits for charging the battery 131.

Referring to FIG. 3, the to-be-charged device 23 further includes a first voltage conversion circuit 234a and a second voltage conversion circuit 234b. The first voltage conversion circuit 234a is connected between the first wireless receiver circuit 132a and the battery 131, and the second voltage conversion circuit 234b is connected between the second wireless receiver circuit 132b and the battery 131.

When any of the output voltage of the first wireless receiver circuit 132a and the output voltage of the second wireless receiver circuit 132b cannot meet the expected charging voltage required by the battery 131, and/or when any of the output current of the first wireless receiver circuit 132a and the output current of the second wireless receiver circuit 132b cannot meet the expected charging current required by the battery 131, they may be first converted by the respective one of the first voltage conversion circuit 234a and the second voltage conversion circuit 234b, so as to obtain the charging voltage and/or charging current expected by the battery 131.

For example, the output voltage and output current of the first wireless receiver circuit 132a are input into the first voltage conversion circuit 234a. After the first voltage conversion circuit 234a converts the input voltage and accordingly the input current, the output voltage and output current of the first voltage conversion circuit are directly applied to both ends of the battery 131, so that the expected charging voltage and/or charging current required by the battery 131 can be met.

The output voltage and output current of the second wireless receiver circuit 132b are input into the second voltage conversion circuit 234b. After the second voltage conversion circuit 234b converts the input voltage and accordingly the input current, the output voltage and output current of the second voltage conversion circuit are directly applied to both ends of the battery 131, so that the expected charging voltage and/or charging current required by the battery 131 can be met.

The control circuit 133 is further configured to control the first voltage conversion circuit 234a and the second voltage conversion circuit 234b, so as to perform the above conversion through the first voltage conversion circuit 234a and the second voltage conversion circuit 234b.

For example, in the case where the battery 131 is charged through two wireless charging channels in the constant current charging stage or in the first charging mode as described above, the control circuit 133 controls both the first voltage conversion circuit 234a and the second voltage conversion circuit 234b to work, so as to perform the above conversion through each of the first voltage conversion circuit 234a and the second voltage conversion circuit 234b.

Alternatively, in the case where the battery 131 is charged through one of the two wireless charging channels in the constant voltage charging stage and/or trickle charging stage or in the second charging mode as described above, when the first wireless receiver circuit 132a is used to receive the electromagnetic waves, the control circuit 133 controls the first voltage conversion circuit 234a to perform the above conversion; and when the second wireless receiver circuit 132b is used to receive the electromagnetic waves, the control circuit 133 controls the second voltage conversion circuit 234b to perform the above conversion.

In addition, as described above, in the case where it is detected that the wireless charging device that charges the to-be-charged device 23 includes only one wireless transmitter coil, when the first wireless receiver circuit 132a is used to receive the electromagnetic waves, the control circuit 133 controls the first voltage conversion circuit 234a to perform the above conversion; alternatively, when the second wireless receiver circuit 132b is used to receive the electromagnetic waves, the control circuit 133 controls the second voltage conversion circuit 234b to perform the above conversion.

Each of the first voltage conversion circuit 234a and the second voltage conversion circuit 234b may be, for example, a BUCK circuit or a charge pump (ChargePump) circuit, or may also be a BOOST circuit. When the battery 131 includes multiple battery cells connected in series, the BOOST circuit may be used to boost the voltage output by the first wireless receiver circuit 132a and/or the second wireless receiver circuit 132b, and the present disclosure is not limited thereto.

It should be noted that the conversion ratio of the charge pump is not limited in the present disclosure. In practical applications, the conversion ratio may be set according to actual requirements, for example, it may be set as 1:1, 2:1, 3:1 and on the like. In addition, when the battery 131 includes multiple battery cells connected in series or multiple battery units connected in series, the conversion ratio of the charge pump may also be set as 1:2, 1:3 and the like to perform a boosting operation, so as to meet the charging voltage required by the battery 131.

In addition, as described above, when the battery 131 includes multiple battery cells or multiple battery units, the individual battery cells or battery units may be charged independently by the charging voltage and/or the charging current output by the first voltage conversion circuit 234a and/or the second voltage conversion circuit 234b, or the multiple battery cells or battery units may also be charged as a whole.

Figure 4:
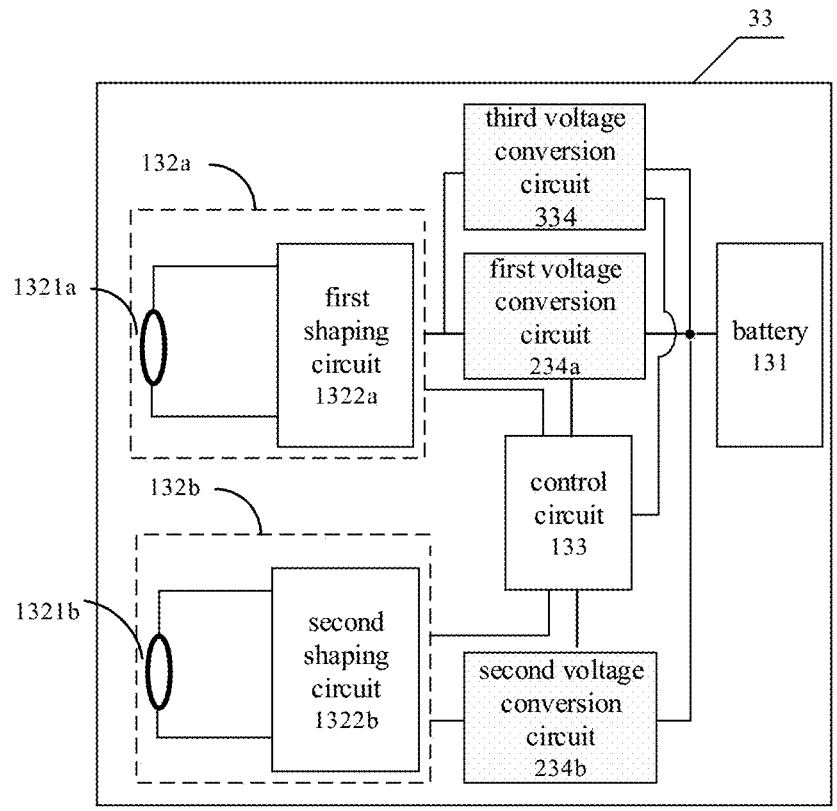
FIG. 4 is a schematic structural diagram of another to-be-charged device provided by an exemplary embodiment of the present disclosure.

FIG. 4 is a schematic structural diagram of another to-be-charged device provided by an exemplary embodiment of the present disclosure.

Referring to FIG. 4, different from the to-be-charged device 23 shown in FIG. 3, the to-be-charged device 33 shown in FIG. 4 may further include a third voltage conversion circuit 334.

As shown in FIG. 4, it is illustrated by taking a case where the third voltage conversion circuit 334 is connected between the first wireless receiver circuit 132a and the battery 131 as an example, but the third voltage conversion circuit 334 may also be connected between the second wireless receiver circuit 132b and the battery 131.

In some embodiments, as described above, in the trickle charging stage and/or the constant voltage charging stage or in the second charging mode described above, or when the wireless charging device includes only one wireless transmitter circuit, only one wireless charging channel is used for charging. For example, the wireless charging channel formed between the first wireless transmitter circuit 121a and the first wireless receiver circuit 132a is used to charge the battery 131. In this case, the third voltage conversion circuit 334 may be used to convert the voltage output by the first wireless receiver circuit 132a, and the charging voltage/ charging current obtained after the conversion is directly applied to both ends of the battery 131 to charge it.

At this time, the control circuit 133 disconnects the passage between the first voltage conversion circuit 234a and the battery 131, and controls the third voltage conversion circuit 334 to convert the voltage output by the first wireless receiver circuit 132a. It should be noted that, when multiple wireless charging channels are used for charging, i.e., when both the first wireless receiver circuit 132a and the second wireless receiver circuit 132b are used for the charging, the control circuit may disconnect the passage between the third voltage conversion circuit 334 and the battery 131, and control the first voltage conversion circuit 234a to convert the voltage output by the first wireless receiver circuit 132a.

The third voltage conversion circuit 334 may also be, for example, a BUCK circuit or a charge pump (ChargePump) circuit, or may also be a BOOST circuit, which is not limited in the present disclosure.

In addition, as described above, when the battery 131 includes multiple battery cells or multiple battery units, the individual battery cells or battery units may be charged independently by the charging voltage and/or charging current output by at least one of the first voltage conversion circuit 234a, the second voltage conversion circuit 234b and the third voltage conversion circuit 334, or the multiple battery cells or battery units may also be charged as a whole.

Figure 5:
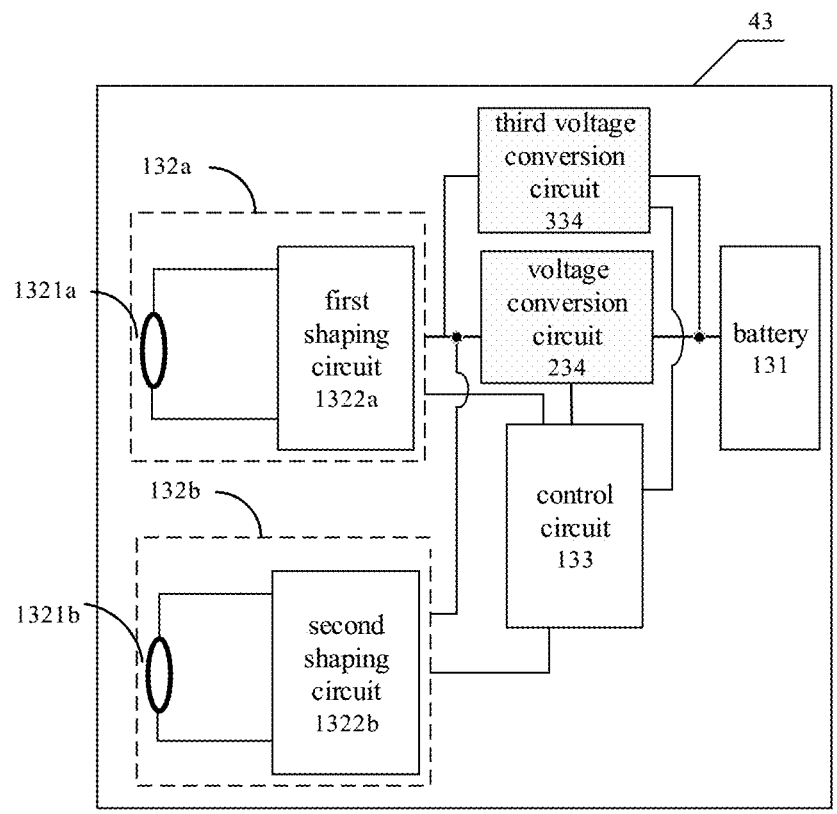
FIG. 5 is a schematic structural diagram of yet another to-be-charged device provided by an exemplary embodiment of the present disclosure.

FIG. 5 is a schematic structural diagram of yet another to-be-charged device provided by an exemplary embodiment of the present disclosure.

Referring to FIG. 5, different from the to-be-charged device 33 shown in FIG. 4, the first voltage conversion circuit 234a and the second voltage conversion circuit 234b of the to-be-charged device 33 are combined into one voltage conversion circuit 234 in the to-be-charged device 43 shown in FIG. 5. When the first wireless receiver circuit 132a and the second wireless receiver circuit 132b work at the same time, the voltage conversion circuit 234 is configured to simultaneously convert the charging voltage and/or charging current output by the first wireless receiver circuit 132a and the second wireless receiver circuit 132b. When only one of the first wireless receiver circuit 132a and the second wireless receiver circuit 132b works, the voltage conversion circuit 234 is configured to convert the charging voltage and/or charging current output by the first wireless receiver circuit 132a or the second wireless receiver circuit 132b. And when only the first wireless receiver circuit 132a works, any of the voltage conversion circuit 234 and the third voltage conversion circuit 334 may convert the voltage and/or current output by the first wireless receiver circuit 132a. Alternatively, the third voltage conversion circuit 334 may be omitted from the to-be-charged device 43.

Figure 6:
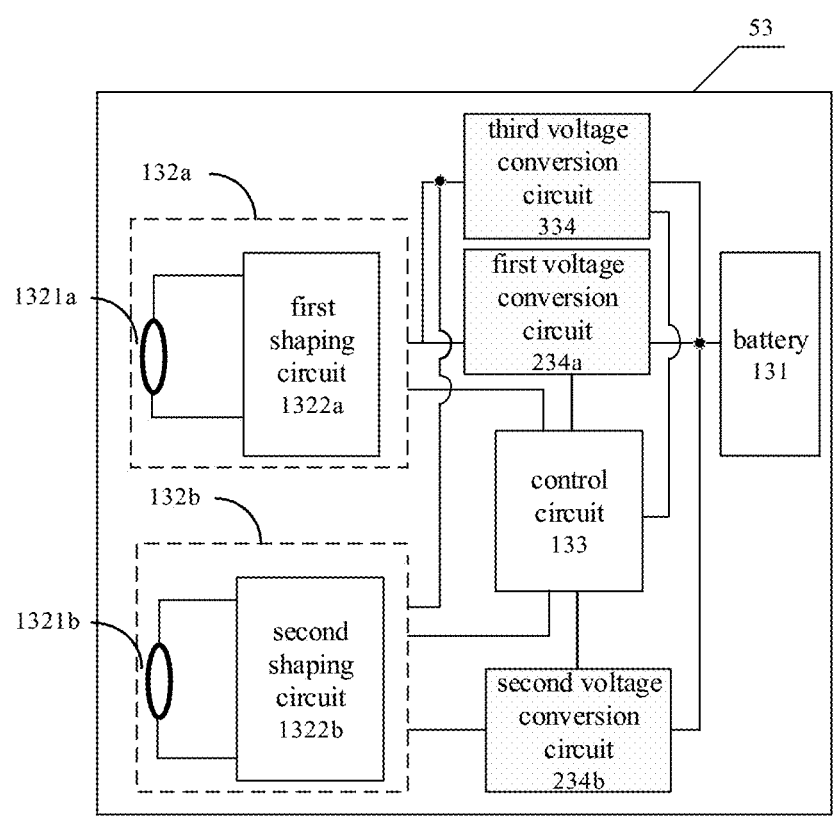
FIG. 6 is a schematic structural diagram of still another to-be-charged device provided by an exemplary embodiment of the present disclosure.

FIG. 6 is a schematic structural diagram of still another to-be-charged device provided by an exemplary embodiment of the present disclosure.

Referring to FIG. 6, different from the to-be-charged device 33 shown in FIG. 4, in the to-be-charged device 53 shown in FIG. 6, the third voltage conversion circuit 334 is also connected between the second wireless receiver circuit 132b and the battery 131.

In some embodiments, in the trickle charging stage and/or the constant voltage charging stage or in the second charging mode described above, two wireless charging channels may also be used for the charging, and in this case, the third voltage conversion circuit 334 may convert the voltage output by the first wireless receiver circuit 132a and the voltage output by the second wireless receiver circuit 132b, and the charging voltage/charging current obtained after the conversion is directly applied to both ends of the battery 131 to charge it.

At this time, the control circuit 133 disconnects the passage between the first voltage conversion circuit 234a and the battery 131 and disconnects the passage between the second voltage conversion circuit 234b and the battery 131, and controls the third voltage conversion circuit 334 to work so as to convert the voltage output by the first wireless receiver circuit 132a and the voltage output by the second wireless receiver circuit 132b.

Referring to FIG. 1 to FIG. 6, the control circuit 133 may also be configured to wirelessly communicate with the wireless charging device 12 during the process that the wireless charging device 12 wirelessly charges the to-be-charged device 13 (or the to-be-charged device 23/33/43/53). For example, the control circuit 133 wirelessly communicates with the control circuit 122 in the wireless charging device 12. Through the communication, the control circuit 133 can send charging information of the to-be-charged device 13 (or the to-be-charged device 23/33/43/53) to the wireless charging device 12. The charging information may include, for example, charging information, such as the output voltage and/or output current, of each of the first wireless receiver circuit 132a and the second wireless receiver circuit 132b. The wireless charging device 12 adjusts the transmit power of the wireless transmitter circuit(s) based on the received information.

In the present disclosure, the communication mode and communication sequence between the wireless charging device 12 and the to-be-charged device 13 (or the to-be-charged device 23/33/43/53) are not limited.

In some embodiments, the wireless communication between the wireless charging device 12 and the to-be-charged device 13 (or the to-be-charged device 23/33/43/53) may be one-way wireless communication. It is illustrated by taking a case where the to-be-charged device 13 (or the to-be-charged device 23/33/43/53) is the initiator of the communication and the wireless charging device 12 is the receiver of the communication in the process of wirelessly charging the battery 131, as an example. For example, the control circuit 133 may send the charging information of the to-be-charged device 13 (or the to-be-charged device 23/33/43/53) to the wireless charging device 12.

In some embodiments, the wireless communication between the wireless charging device 12 and the to-be-charged device 13 (or the to-be-charged device 23/33/43/53) may also be two-way wireless communication. The two-way wireless communication generally requires the receiver to send response information to the initiator after receiving a communication request initiated by the initiator. The two-way communication enables the communication process to be more secure. In the two-way wireless communication process, any one of the wireless charging device 12 and the to-be-charged device 13 (or the to-be-charged device 23/33/43/53) may serve as a master device to initiate a two-way communication session, and correspondingly, the other one/party may serve as a slave device to make a first response or first reply to the communication initiated by the master device. Further, after receiving the first response or the first reply, the master device makes a targeted second response, thereby completing one communication negotiation between the master device and the slave device.

As for the targeted second response made by the master device after receiving the first response or the first reply, even if the master device does not receive, within a preset period of time, the first response or first reply made by the slave device for the communication session, the master device may also make the targeted second response.

In addition, after the slave device makes the first response or the first reply to the communication session initiated by the master device, it is also unnecessary for the master device to make the targeted second response to the first response or the first reply of the slave device. In this way, one communication negotiation process is completed between the master device and the slave device.

During the communication performed between the wireless charging device 12 and the to-be-charged device 13 (or the to-be-charged device 23/33/43/53), the control circuit 133 in the to-be-charged device 13 (or the to-be-charged device 23/33/43/53) may couple the charging information of the first wireless receiver circuit 132a and the charging information of the second wireless receiver circuit 132b respectively to the first receiver coil 1321a and the second receiver coil 1321b, for sending them to the control circuit 122 of the wireless charging device 12.

Alternatively, the charging information of the first wireless receiver circuit 132a and the charging information of the second wireless receiver circuit 132b may be both transmitted through the receiver coil of one wireless receiver circuit, for example, both are transmitted through the first receiver coil 1321a, or both are transmitted through the second receiver coil 1321b. The first wireless receiver circuit 132a and the second wireless receiver circuit 132b may communicate with each other, to exchange the charging information therebetween.

Alternatively, the to-be-charged device 13 (or the to-be-charged device 23/33/43/53) may also communicate, via at least one of the following communication modes, with the wireless charging device 12 to send the above feedback information to the wireless charging device 12:

Bluetooth communication, WiFi communication, mobile cellular network communication (such as 2G, 3G, 4G or 5G), wireless communication (such as IEEE 802.11, 802.15 (WPANs), 802.16 (WiMAX), and 802.20), short-range wireless communication based on high-frequency antennas (such as 60 GHz), optical communication (such as infrared communication), ultrasonic communication, ultra-wideband (UMB) communication and other communication modes. It can be understood that, when the above communication modes are used, each of the to-be-charged device 13 (or the to-be-charged device 23/33/43/53) and the wireless charging device 12 also includes a corresponding communication module, such as at least one of a Bluetooth communication module, WiFi communication module, 2G/3G/4G/5G mobile communication module, high-frequency antenna, optical communication module, ultrasonic communication module, and an ultra-wideband communication module. It should be understood that standards applicable for the wireless communication mentioned above include past and existing standards, and also include future versions of these standards and future standards without departing from the scope of the present disclosure. The wireless communication modes mentioned above can improve the reliability of the communication, thereby improving the charging safety. Compared with the related art (for example, Qi standard) in which the feedback information is coupled, through signal modulation, to the receiver coil of the wireless receiver circuit for communication, the reliability of the communication can be improved, and the voltage ripples caused by the signal coupling can be avoided, where such voltage ripples affect the voltage processing of the voltage conversion circuit in the to-be-charged device. In addition, if the voltage ripples exist in the output of the wireless receiver coil, and such ripples are not effectively eliminated, it may reduce the safety of wireless charging, bringing a certain security risk. Communication performed through the above wireless communication modes can avoid the voltage ripples, thereby omitting a circuit for processing the voltage ripples. In this way, the complexity of the charging circuit of the to-be-charged device can be reduced, the charging efficiency is improved, the space occupied by the circuit can be saved, and the cost is reduced.

The charging information mentioned above may include, for example, the output voltage and/or output current of each of the first wireless receiver circuit 132a and the second wireless receiver circuit 132b.

After the wireless charging device 12 receives the charging information fed back from the control circuit 133, the wireless charging device 12 may adjust, based on the received charging information, the first wireless transmitter circuit 121a, so as to make the output voltage and/or current of the first wireless receiver circuit 132a match the charging voltage and/or charging current required by the battery 131; and adjust, based on the received charging information, the second wireless transmitter circuit 121b, so as to make the output voltage and/or current of the second wireless receiver circuit 132b match the charging voltage and/or charging current required by the battery 131.

It should be understood that the above-mentioned "match" includes a case where difference between the output voltage and/or output current of the wireless receiver circuit and the charging voltage and/or charging current required by the battery 131 is within a preset range.

Alternatively, the wireless charging device 12 may adjust, based on the received charging information, the first wireless transmitter circuit 121a, so as to make the output voltage and/or current of the first wireless receiver circuit 132a meet the charging requirements of the battery 131 in at least one of the trickle charging stage, the constant voltage charging stage and the constant current charging stage; and adjust, based on the received charging information, the second wireless transmitter circuit 121b, so as to make the output voltage and/or current of the second wireless receiver circuit 132b meet the charging requirements of the battery 131 in at least one of the trickle charging stage, the constant voltage charging stage and the constant current charging stage.

In addition, as described above, the control circuit 133 may also send battery status information to the control circuit 122. The battery status information includes a current battery level and/or a current voltage of the battery 131 of the to-be-charged device 13 (or 23/33). After receiving the battery status information, the control circuit 122 may first determine the current charging stage of the battery 131 based on the battery status information, and then determine a target output voltage and/or target output current matching the current charging stage of the battery 131. Then, the control circuit 122 may compare the output voltage and/or output current of each wireless receiver circuit sent from the control circuit 133 with the determined target output voltage value and/or target output current matching the current charging stage of the battery 131, to determine whether the output voltage and/or output current of each wireless receiver circuit matches the determined current charging stage of the battery 131. If the output voltage and/or output current of each wireless receiver circuit does not match the determined current charging stage of the battery 131, the transmit power of various wireless transmitter circuit is adjusted until the feedback output voltage and/or output current of each wireless receiver circuit matches the current charging stage of the battery 131.

In addition, as described above, the control circuit 133 may directly feed back the detected output voltage and/or output current of each wireless receiver circuit to the control circuit 122, or may also feed back to the control circuit 122 an adjustment instruction that is determined based on the detected output voltage and/or output current of each wireless receiver circuit. The adjustment instruction may be, for example, configured to instruct the transmit power of each wireless transmitter circuit to be increased or decreased. Alternatively, the wireless charging device 12 may also set multiple levels for the transmit power of each wireless transmitter circuit. Each time the control circuit 122 receives the adjustment instruction, it adjusts the transmit power of each wireless transmitter circuit by one level, until the feedback output voltage and/or output current of each wireless receiver circuit matches the current charging stage of the battery 131. Alternatively, the adjustment instruction may also be configured to instruct the wireless charging device to stop charging when an abnormality occurs in the charging, where the abnormality includes for example overcurrent of the charging current, overvoltage, and abnormal heating.

In addition, the charging information may further include temperature information. For example, the temperature information may include at least one of: the temperature of the battery 133; the maximum temperature of the back case of the to-be-charged device 13 (or 23/33) (for example, the temperatures at multiple positions of the back case may be detected, and the highest one of the temperatures is taken); and temperatures at various preset positions of the to-be-charged device 13 (or 23/33). For example, the temperature information may be transmitted through both the first receiver coil 1321a and the second receiver coil 1321b, or transmitted through only one of the first receiver coil 1321a and the second receiver coil 1321b, or sent through other wireless communication modules mentioned above.

As described above, after receiving the charging information fed back from the to-be-charged device 13 (or 23/33), the wireless charging device 12 may adjust, based on the charging information, the transmit power of the first wireless transmitter circuit 121a and/or the transmit power of the second wireless transmitter circuit 121b.

When the output voltage (or output power) of the power supply device 11 is fixed, the input voltage of the first wireless transmitter circuit 121a and the input voltage of the second wireless transmitter circuit 121b are fixed. In this case, the control circuit 122 may adjust, based on the charging information fed back from the to-be-charged device 13 (or 23/33), the operating frequency and/or the duty cycle of the transmitted electromagnetic signal of the first wireless transmitter circuit 121a and/or the second wireless transmitter circuit 121b, so as to adjust the transmit power of the first wireless transmitter circuit 121a and/or the transmit power of the second wireless transmitter circuit 121b.

In addition, the above-mentioned charging information may further include temperature information. For example, the temperature information may include at least one of: the temperature of the battery 133; the maximum temperature of the back case of the to-be-charged device 13 (or 23/33) (for example, the temperatures at multiple positions of the back case may be detected, and the highest one of the temperatures is taken); and the temperatures at various preset positions of the to-be-charged device 13 (or 23/33); or indication information determined based on the temperature information. The control circuit 122 may adjust, based on the temperature information or indication information, the operating frequency and/or the duty cycle of the transmitted electromagnetic signal of each of the first wireless transmitter circuit 121a and the second wireless transmitter circuit 121b, so as to adjust the transmit power of the first wireless transmitter circuit 121a and/or the transmit power of the second wireless transmitter circuit 121b respectively, thereby controlling the temperatures at different positions of the to-be-charged device 13 (or 23/33). For example, when the temperature near the first wireless receiver circuit 132a of the to-be-charged device 13 (or 23/33) is too high, the transmit power of the first wireless transmitter circuit 121a coupled with the first wireless receiver circuit is reduced; and when the temperature near the second wireless receiver circuit 132b is too high, the transmit power of the second wireless transmitter circuit 121b coupled with the second wireless receiver circuit is reduced.

In some embodiments, when the output voltage and/or output current of the power supply device 11 is adjustable, the control circuit 122 may also communicate with the power supply device 11 to request the power supply device to provide a corresponding output voltage, so as to adjust the transmit power of the first wireless transmitter circuit 121a and/or the transmit power of the second wireless transmitter circuit 121b, so that the output voltage and/or the output current of the first wireless receiver circuit 132a and/or the second wireless receiver circuit 132b meet the charging requirements of the battery 131 in the current charging stage.

In addition, the control circuit 122 may also adjust the amount of power drawn from the output power provided by the power supply device 11, thereby adjusting the transmit power of the first wireless transmitter circuit 121a and/or the transmit power of the second wireless transmitter circuit 121b. For example, a power adjustment circuit is provided inside the wireless charging device 12. The power adjustment circuit may include, for example, a pulse width modulation (PWM) controller and a switch unit. The control circuit 122 may adjust the transmit power of the first wireless transmitter circuit 121a and/or the transmit power of the second wireless transmitter circuit 121b by adjusting the duty cycle of the control signal sent by the PWM controller and/or by controlling the switching frequency of the switch unit.

Figure 7:
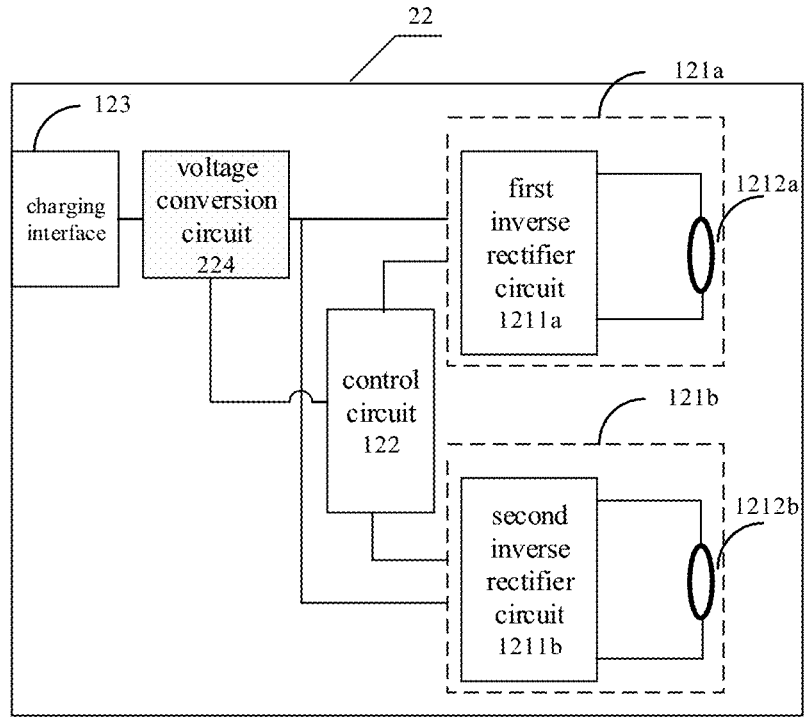
FIG. 7 is a schematic structural diagram of a wireless charging device provided by an exemplary embodiment of the present disclosure.

FIG. 7 is a schematic structural diagram of a wireless charging device provided by an exemplary embodiment of the present disclosure.

Referring to FIG. 7, the wireless charging device 22 further includes a voltage conversion circuit 224. The voltage conversion circuit 224 is connected to each of the charging interface 123, the first wireless transmitter circuit 121a, the second wireless transmitter circuit 121b and the control circuit 122, and is configured to convert the output voltage and/or output current of the power supply device 11.

The control circuit 122 is further configured to control the voltage conversion circuit 224 to convert the output voltage and/or output current of the power supply device 11, to adjust the transmit power of the first wireless transmitter circuit 121a and/or the transmit power of the second wireless transmitter circuit 121b.

When the output voltage (or output power) of the power supply device 11 is fixed, the control circuit 122 may adjust the output voltage and/or output current of the voltage conversion circuit 224 to adjust the transmit power of the first wireless transmitter circuit 121a and/or the transmit power of the second wireless transmitter circuit 121b, so that the charging requirements of the battery 131 in each charging stage can be met.

Figure 8:
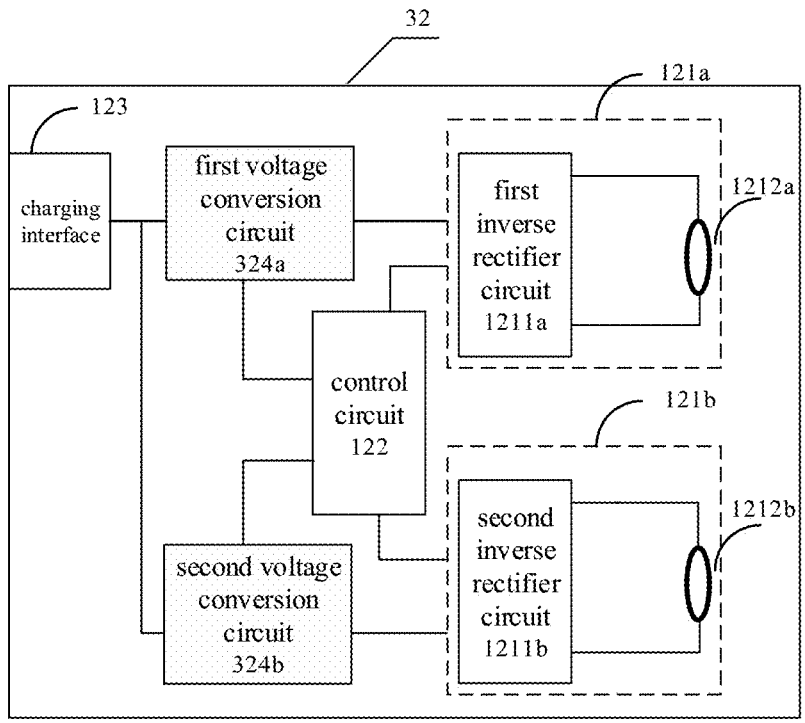
FIG. 8 is a schematic structural diagram of another wireless charging device provided by an exemplary embodiment of the present disclosure.

FIG. 8 is a schematic structural diagram of another wireless charging device provided by an exemplary embodiment of the present disclosure.

Different from the wireless charging device 22 shown in FIG. 7, the wireless charging device 32 shown in FIG. 8 may include a first voltage conversion circuit 324a and a second voltage conversion circuit 324b.

The first voltage conversion circuit 324a is connected with each of the charging interface 123, the first wireless transmitter circuit 121a and the control circuit 122, and is configured to convert the voltage/current input through the charging interface 123 (i.e., the output voltage and/or output current of the power supply device 11).

The second voltage conversion circuit 324b is connected to each of the charging interface 123, the second wireless transmitter circuit 121b and the control circuit 122, and is configured to convert the voltage/current input through the charging interface 123 (i.e., the output voltage and/or output current of the power supply device 11).

The control circuit 122 controls, based on the received charging information of the first wireless receiver circuit 132a, the first voltage conversion circuit 324a to convert the output voltage and/or output current of the power supply device 11, so as to adjust the transmit power of the first wireless transmitter circuit 121a. In addition, the control circuit 122 controls, based on the received charging information of the second wireless reception circuit 132b, the second voltage conversion circuit 324b to convert the output voltage and/or output current of the power supply device 11, so as to adjust the transmit power of the second wireless transmitter circuit 121b.

By setting the voltage conversion circuits for the first wireless transmitter circuit 121a and the second wireless transmitter circuit 121b respectively, the first wireless transmitter circuit 121a may be provided with different input voltage and/or input current from that of the second wireless transmitter circuit 121b, so that the transmit power of the first wireless transmitter circuit 121a and the transmit power of the second wireless transmitter circuit 121b may be adjusted to be different from each other.

For example, when the temperatures at various preset positions of the to-be-charged device 13 (or 23/33) are different, the control circuit 122 may adjust, based on the temperature information or the indication information, the first voltage conversion circuit 324a and the second voltage conversion circuit 324b, so as to adjust the transmit power of the first wireless transmitter circuit 121a and/or the transmit power of the second wireless transmitter circuit 121b respectively, thereby controlling the temperatures at different positions of the to-be-charged device 13 (or 23/33). For example, when the temperature near the first wireless receiver circuit 132a of the to-be-charged device 13 (or 23/33) is too high, the transmit power of the first wireless transmitter circuit 121a coupled with the first wireless receiver circuit is reduced; and when the temperature near the second wireless receiver circuit 132b is too high, the transmit power of the second wireless transmitter circuit 121b coupled with the second wireless receiver circuit is reduced.

In the above, it is illustrated by taking a case where the wireless charging device 12 (or 22/32) is connected to the power supply device 11 to obtain the electric energy from the power supply device 11 as an example, but the present disclosure is not limited thereto. The wireless charging device 12 (or 22/32) may also be integrated therein with function components like an adapter, so as to directly convert the externally input AC power (such as the commercial power) into the above-mentioned electromagnetic signals (or electromagnetic waves). For example, the function of the adapter may be integrated in the wireless transmitter circuit (121a and/or 121b) of the wireless charging device 12 (or 22/32). For example, a rectifier circuit, a primary filter circuit and/or a transformer and the like may be integrated in the wireless transmitter circuit (121a and/or 121b). In this way, the wireless transmitter circuit (121a and/or 121b) may be used to receive the externally input AC power (e.g., 220V AC power, or commercial power), and generate electromagnetic signals (or electromagnetic waves) based on the AC power. Integrating an adapter-like function component inside the wireless charging device 12 or 22 makes it not necessary for the wireless charging device 12 (or 22/32) to obtain the electric energy from an external power supply device, thereby improving the integration of the wireless charging device 12 (or 22/32), and reducing the number of devices required to implement the wireless charging.

In addition, the wireless charging device 12 (or 22/32) may support a first wireless charging mode and a second wireless charging mode. The charging speed at which the wireless charging device 12 (or 22/32) charges the to-be-charged device (or 23/33) in the first wireless charging mode is faster than the charging speed at which the wireless charging device 12 (or 22/32) charges the to-be-charged device (or 23/33) in the second wireless charging mode. In other words, compared with the wireless charging device 12 (or 22/32) operating in the second wireless charging mode, the wireless charging device 12 (or 22/32) operating in the first wireless charging mode takes less time to fully charge the battery of the same capacity in the to-be-charged device 13 (or 23/33).

The first wireless charging mode may be a fast wireless charging mode. In the fast wireless charging mode, the transmit power of the wireless charging device 12 (or 22/32) is relatively large (usually greater than or equal to 15 W). The second wireless charging mode may be a common wireless charging mode, for example, a conventional wireless charging mode based on the QI standard, the PMA standard or the A4WP standard. In this common wireless charging mode, the transmit power of the wireless charging device 12 (or 22/32) is relatively small (usually less than 15 W, and the commonly used transmit power is 5 W or 10 W). The first wireless charging mode corresponds to the first charging mode of the to-be-charged device, and the second wireless charging mode corresponds to the second charging mode of the to-be-charged device.

In some embodiments, the two-way communication is performed between the control circuit 122 and the control circuit 133, to control the transmit power of the wireless transmitter circuit (121a and/or 121b).

In some embodiments, with regard to the provision that the two-way communication may be performed between the control circuit 122 and the control circuit 133 to control the transmit power of the wireless transmitter circuit (121a and/or 121b), it may include that: the two-way communication is performed between the control circuit 122 and the control circuit 133 to negotiate the wireless charging mode between the wireless charging device 12 (or 22/32) and the to-be-charged device 13 (or 23/33).

For example, handshake communication is performed between the control circuit 122 and the control circuit 133. When the handshake communication is successful, the wireless charging device 12 (or 22/32) is controlled to operate in the first wireless charging mode to charge the to-be-charged device 13 (or 23/33). When the handshake communication fails, the wireless charging device 12 (or 22/32) is controlled to operate in the second wireless charging mode to charge the to-be-charged device 13 (or 23/33).

The handshake communication may refer to a communication in which the two communication parties identify each other's identities. The success of the handshake communication may indicate that both the wireless charging device 12 (or 22/32) and the to-be-charged device 13 (or 23/33) support wireless charging with adjustable transmit power. The failure of the handshake communication may indicate that at least one of the wireless charging device 12 (or 22/32) and the to-be-charged device 13 (or 23/33) does not support the wireless charging with adjustable transmit power.

In the present disclosure, the wireless charging device 12 (or 22/32) does not blindly use the first wireless charging mode to perform the fast wireless charging on the to-be-charged device 13 (or 23/33), but performs the two-way communication with the to-be-charged device 13 (or 23/33) to negotiate whether the wireless charging device 12 (or 22/32) can use the first wireless charging mode to perform the fast wireless charging on the to-be-charged device 13 (or 23/33), which can improve the safety of the charging process.

In some embodiments, the two-way communication is performed between the control circuit 122 and the control circuit 133 to negotiate the wireless charging mode between the wireless charging device 12 (or 22/32) and the to-be-charged device 13 (or 23/33). Specifically, for example, the control circuit 122 sends a first instruction to the control circuit 133, where the first instruction is configured to ask the to-be-charged device 13 (or 23/33) whether to enable the first wireless charging mode. The control circuit 122 receives a reply instruction sent from the control circuit 133 for the first instruction, where the reply instruction is configured to indicate whether the to-be-charged device 13 (or 23/33) agrees to enable the first wireless charging mode. When the to-be-charged device 13 (or 23/33) agrees to enable the first wireless charging mode, the control circuit 122 controls the wireless charging device 12 (or 22/32) to charge the to-be-charged device 13 (or 23/33) in the first wireless charging mode.

In addition to determining the wireless charging mode through the communication negotiation, the control circuit 122 may also select or switch the wireless charging mode based on some other factors. For example, the control circuit 122 may also control, based on the temperature of the battery 131, the wireless charging device 12 (or 22/32) to charge the battery 131 in the first wireless charging mode or the second wireless charging mode. For example, when the temperature is lower than a preset low temperature threshold (such as 5° C. or 10° C.), the control circuit 122 may control the wireless charging device 12 (or 22/32) to perform the common charging in the second wireless charging mode; and when the temperature is greater than or equal to the low temperature threshold, the control circuit 122 may control the wireless charging device 12 (or 22/32) to perform the fast charging in the first wireless charging mode. Further, when the temperature is higher than a high temperature threshold (such as 50° C.), the control circuit 122 may control the wireless charging device 12 (or 22/32) to stop charging.

Figure 9:
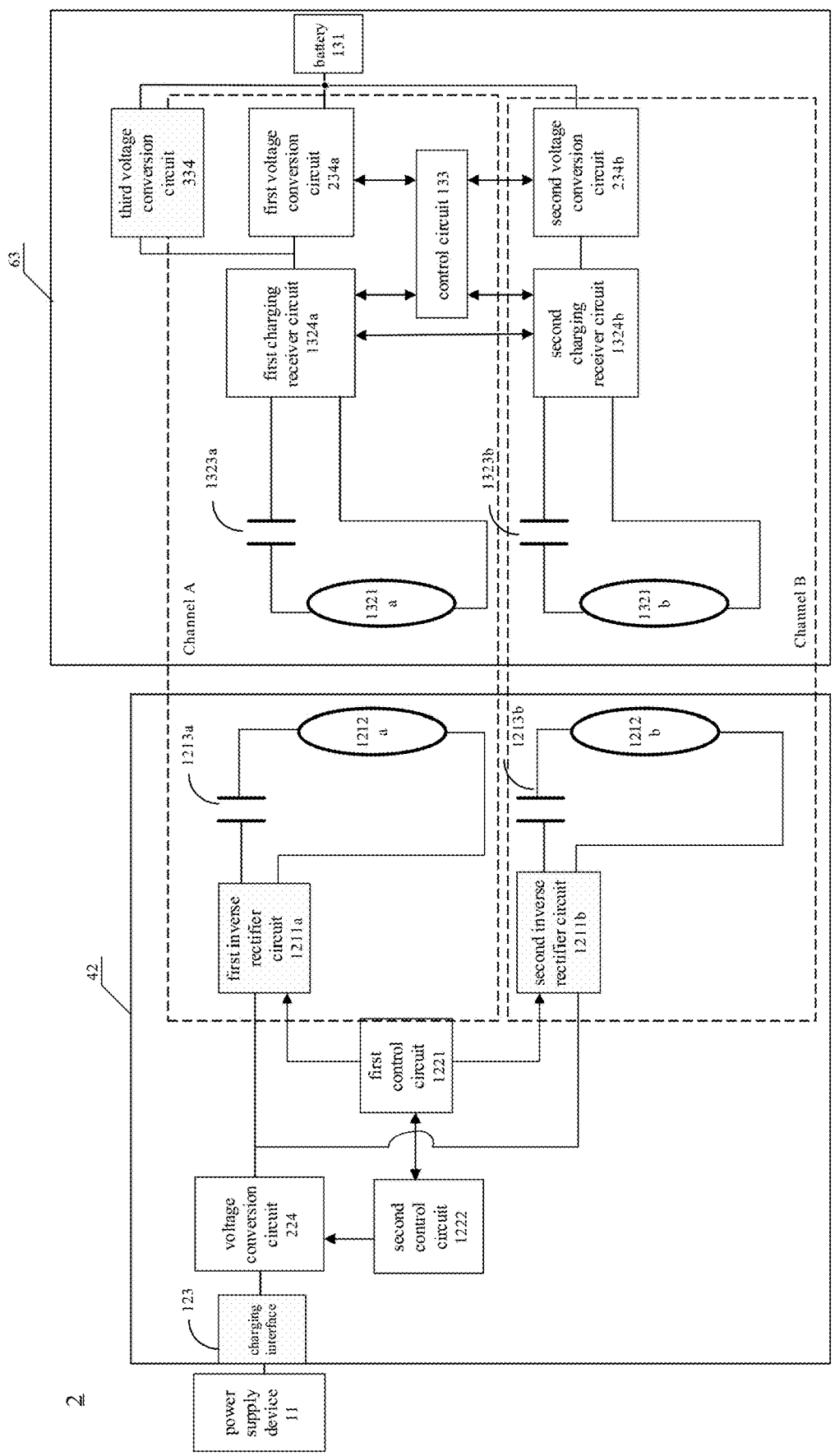
FIG. 9 is a schematic structural diagram of yet another wireless charging system provided by an exemplary embodiment of the present disclosure.

FIG. 9 is a schematic structural diagram of yet another wireless charging system provided by an exemplary embodiment of the present disclosure.

Referring to FIG. 9, the control circuit 122 of the wireless charging device 42 in the wireless charging system 2 may further include a first control circuit 1221 and a second control circuit 1222. The first control circuit 1221 is configured to drive the first wireless transmitter circuit 121a and the second wireless transmitter circuit 121b to work. In addition, the first control circuit 1221 may also be configured to implement the control procedures of wireless charging standards, such as the QI standard, the PMA standard, or the A4WP standard. For example, the second control circuit 1222 may be configured to communicate with the control circuit 133 in the to-be-charged device 13 (or 23/33), and based on the charging information fed back from the control circuit 133, control the first control circuit 1221 to adjust the transmit power of the first wireless transmitter circuit 121a and/or the transmit power of the second wireless transmitter circuit 121b.

In addition, the first wireless transmitter circuit 121a may further include a first capacitor 1213a matching the respective transmitter coil, and the second wireless transmitter circuit 121b may further include a second capacitor 1213b matching the respective transmitter coil.

In addition, the first wireless receiver circuit 132a in the to-be-charged device 63 includes a first receiver coil 1321a and a first charging receiver circuit 1324a. The first charging receiver circuit 1324a can not only perform the rectification and/or filtering operations of the first shaping circuit 1322a mentioned above, but also implement the control procedures of wireless charging standards, such as the QI standard, the PMA standard, or the A4WP standard, as well as other related protection control functions.

The second wireless receiver circuit 132b includes a second receiver coil 1321b and a second charging receiver circuit 1324b. The second charging receiver circuit 1324b can not only perform the rectification and/or filtering operations of the second shaping circuit 1322b mentioned above, but also implement the control procedures of wireless charging standards, such as the QI standard, the PMA standard, or the A4WP standard, as well as other related protection control functions.

In addition, the first charging receiver circuit 1324a and the second charging receiver circuit 1324b may also communicate with each other to receive each other' charging information, so that the communication with the wireless charging device 42 can be implemented through one of the first wireless receiver circuit 132a and the second wireless receiver circuit 132b.

In addition, the first wireless receiver circuit 132a may further include a first capacitor 1323a matching the respective receiver coil, and the second wireless receiver circuit 132b may further include a second capacitor 1323b matching the respective receiver coil.

Figure 10:
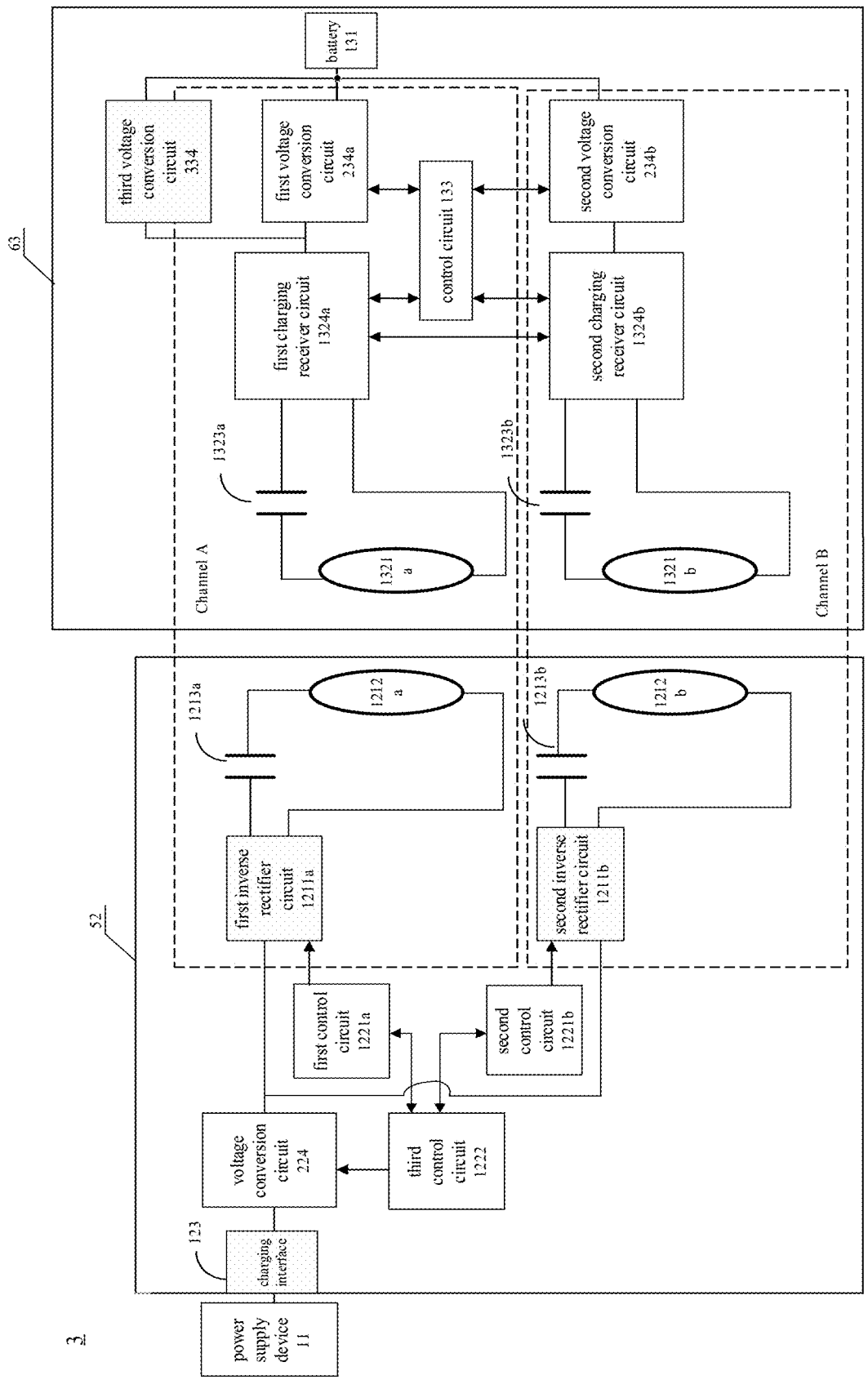
FIG. 10 is a schematic structural diagram of still another wireless charging system provided by an exemplary embodiment of the present disclosure.

FIG. 10 is a schematic structural diagram of still another wireless charging system provided by an exemplary embodiment of the present disclosure. Different from the wireless charging system 2 shown in FIG. 9, the control circuit 122 of the wireless charging device 52 in the wireless charging system 3 shown in FIG. 10 includes a first control circuit 1221a, a second control circuit 1221b, and a third control circuit 1222. The first control circuit 1221a is configured to drive the first wireless transmitter circuit 121a to work, and the second control circuit 1221b is configured to drive the second wireless transmitter circuit 121b to work. That is, in the wireless charging device 52, the first wireless transmitter circuit 121a may be controlled by the first control circuit 1221a, and the second wireless transmitter circuit 121b may be controlled by the second control circuit 1221b. The third control circuit 1222 is connected with each of the first control circuit 1221a and the second control circuit 1221b. The function of the third control circuit 1222 is similar to that of the second control circuit 1222 shown in FIG. 9, which will not be repeated here.

FIG. 11 is a schematic structural diagram of still yet another wireless charging system provided by an exemplary embodiment of the present disclosure. Different from the wireless charging system 2 shown in FIG. 9, the wireless charging device 62 in the wireless charging system 4 shown in FIG. 11 includes only the first wireless transmitter circuit 121*a*. The first control circuit 1221 is configured to drive the first wireless transmitter circuit 121*a* to work. In addition, the first control circuit 1221 may also be configured to implement the control procedures of wireless charging standards, such as the QI standard, the PMA standard, or the A4WP standard. For example, the second control circuit 1222 may be configured to communicate with the control circuit 133 of the to-be-charged device 13 (or 23/33), and based on the charging information fed back from the control circuit 133, control the first control circuit 1221 to adjust the transmit power of the first wireless transmitter circuit 121*a*.

The method embodiments of the present disclosure will be further described below, which can be applied to the device embodiments of the present disclosure. For details not disclosed in the method embodiments of the present disclosure, reference may be made to the device embodiments of the present disclosure.

FIG. 12 is a flowchart of a wireless charging method provided by an exemplary embodiment of the present disclosure. For example, the method can be implemented by the to-be-charged device provided by the above embodiments.

Referring to FIG. 12, the wireless charging method 10 includes operations as follows.

In operation S102, in various charging stages, an electromagnetic signal transmitted by the wireless charging device is received by the first wireless receiver circuit of the to-be-charged device, and/or an electromagnetic signal transmitted by the wireless charging device is received by the second wireless receiver circuit.

In some embodiments, the charging stages include at least one of: a trickle charging stage, a constant current charging stage, and a constant voltage charging stage.

In some embodiments, operation S102 may include: in the constant current charging stage, charging the battery through both the first wireless receiver circuit and the second wireless receiver circuit.

In some embodiments, operation S102 may include: in the trickle charging stage and/or the constant voltage charging stage, charging the battery through the first wireless receiver circuit or the second wireless receiver circuit.

In operation S104, the electromagnetic signals are each converted into a charging current for charging the battery in the to-be-charged device.

In some embodiments, when the battery is charged through the first wireless receiver circuit and the second wireless receiver circuit simultaneously, before operation S104, the method 10 may further include: converting, through the first voltage conversion circuit of the to-be-charged device, the charging voltage and/or charging current output by the first wireless receiver circuit; and converting, through the second voltage conversion circuit of the to-be-charged device, the charging voltage and/or charging current output by the second wireless receiver circuit.

In some embodiments, when the battery is charged through the first wireless receiver circuit or the second wireless receiver circuit, that is, when the battery is charged through only one of the first wireless receiver circuit and the second wireless receiver circuit, before operation S104, the method 10 may further include: converting, through the first voltage conversion circuit, the charging voltage and/or charging current output by the first wireless receiver circuit; or converting, through the second voltage conversion circuit, the charging voltage and/or charging current output by the second wireless receiver circuit.

In some embodiments, when the battery is charged through the first wireless receiver circuit or the second wireless receiver circuit, that is, when the battery is charged through only one of the first wireless receiver circuit and the second wireless receiver circuit, before operation S104, the method 10 may further include: converting, through the third voltage conversion circuit of the to-be-charged device, the charging voltage and/or the charging current output by the first wireless receiver circuit or the second wireless receiver circuit.

In some embodiments, the method 10 may further include: controlling the first wireless receiver circuit or the second wireless receiver circuit to charge the battery, in response to detecting that the wireless charging device includes only one wireless transmitter circuit.

In the wireless charging method provided by the embodiments of the present disclosure, in various charging stages, different numbers of wireless charging channels can be used to wirelessly charge the to-be-charged device. When multiple wireless charging channels are used for the wireless charging, the wireless charging power can be greatly improved (for example, when two wireless charging channels are used, the charging power can be almost doubled; when three wireless charging are used, the charging power can be almost three times that of using a single channel, and so on), thereby speeding up the charging of the battery.

FIG. 13 is a flowchart of another wireless charging method provided by an exemplary embodiment of the present disclosure. Compared with the wireless charging method 10 shown in FIG. 12, the wireless charging method 20 shown in FIG. 13 may further include operation as follows.

In operation S106, the charging information of the to-be-charged device is transmitted to the wireless charging device.

In some embodiments, the charging information includes: the output voltage and/or output current of the first wireless receiver circuit, and the output voltage and/or output current of the second wireless receiver circuit.

In some embodiments, operation S106 may include: transmitting, through the first wireless receiver circuit, the output voltage and/or output current of the first wireless receiver circuit to the wireless charging device, and transmitting, through the second wireless receiver circuit, the output voltage and/or output current of the second wireless receiver circuit to the wireless charging device; alternatively, transmitting, through one of the first wireless receiver circuit and the second wireless receiver circuit, the output voltage and/or output current of the first wireless receiver circuit and the output voltage and/or output current of the second wireless receiver circuit to the wireless charging device.

In some embodiments, the charging information further includes temperature information. The temperature information includes at least one of: the temperature of the battery, the maximum temperature of the back case of the to-be-charged device, and the temperatures at different preset positions of the to-be-charged device.

In some embodiments, step S106 may include: transmitting, through one of the first wireless receiver circuit and the second wireless receiver circuit, the temperature information to the wireless charging device.

In some embodiments, the method 10 further includes: determining, based on the charging information of the to-be-charged device, an adjustment instruction for the wireless charging device; and controlling the to-be-charged device to transmit the adjustment instruction to the wireless charging device. The adjustment instruction is configured to instruct the wireless charging device to increases or decreases the transmit power of each of the wireless transmitter circuits in the wireless charging device, or the adjustment instruction is configured to instruct the wireless charging device to stop charging when an abnormality occurs in the charging, where the abnormality includes for example overcurrent of the charging current, overvoltage, and abnormal heating.

FIG. 14 is a flowchart of yet another wireless charging method provided by an exemplary embodiment of the present disclosure. For example, the method may be implemented by the wireless charging device provided in the above-mentioned embodiments.

Referring to FIG. 14, the wireless charging method 30 includes operations as follows.

In operation S302, in various charging stages of the to-be-charged device, the electric energy input from the power supply device is converted, through the first wireless transmitter circuit and/or the second wireless transmitter circuit of the wireless charging device, into an electromagnetic signal for transmission, and wirelessly charge the to-be-charged device.

In some embodiments, the charging stages include at least one of: a trickle charging stage, a constant current charging stage, and a constant voltage charging stage.

In some embodiments, operation S302 includes: in the constant current charging stage, transmitting the electromagnetic signal through both the first wireless transmitter circuit and the second wireless transmitter circuit.

In some embodiments, operation S302 includes: in the trickle charging stage and/or the constant voltage charging stage, controlling the first wireless transmitter circuit or the second transmitter circuit to transmit the electromagnetic signal.

In the wireless charging method provided by the embodiments of the present disclosure, in various charging stages, different numbers of wireless charging channels can be used to wirelessly charge the to-be-charged device. When multiple wireless charging channels are used for the wireless charging, the wireless charging power can be greatly improved (for example, when two wireless charging channels are used, the charging power can be almost doubled; when three wireless charging are used, the charging power can be almost three times that of using a single channel, and so on), thereby speeding up the charging of the battery.

FIG. 15 is a flowchart of still another wireless charging method provided by an exemplary embodiment of the present disclosure. Different from the wireless charging method 30 shown in FIG. 14, the wireless charging method 40 shown in FIG. 15 may further include operations as follows.

In operation S304, the charging information sent from the to-be-charged device is received.

In some embodiments, the charging information includes: the output voltage and/or output current of the first wireless receiver circuit of the to-be-charged device, the first wireless receiver circuit matching the first wireless transmitter circuit; and the output voltage and/or output current of the second wireless transmitter circuit of the to-be-charged device, the second wireless transmitter circuit matching the second wireless transmitter circuit.

In operation S306, based on the charging information, the transmit power of the first wireless transmitter circuit and/or the transmit power of the second wireless transmitter circuit is adjusted.

In some embodiments, operation S306 includes: based on the charging information, converting, through the voltage conversion circuit of the wireless charging device, the output voltage and/or output current of the power supply device, so as to adjust the transmit power of the first wireless transmitter circuit and/or the transmit power of the second wireless transmitter circuit.

In some embodiments, operation S306 includes: based on the output voltage and/or output current of the first wireless receiver circuit, converting, through the first voltage conversion circuit of the wireless charging device, the output voltage and/or output current of the power supply device, to adjust the transmit power of the first wireless transmitter circuit; and based on the output voltage and/or output current of the second wireless receiver circuit, converting, through the second voltage conversion circuit of the wireless charging device, the output voltage and/or output current of the power supply device, to adjust the transmit power of the second wireless transmitter circuit.

In some embodiments, the charging information further includes temperature information. The temperature information includes at least one of: the temperature of the battery, the maximum temperature of the back case of the to-be-charged device, and the temperatures at various preset positions of the to-be-charged device. Operation S306 includes: based on the temperature information, converting, through the first voltage conversion circuit, the output voltage and/or output current of the power supply device, to adjust the transmit power of the first wireless transmitter circuit; and based on the temperature information, converting, through the second voltage conversion circuit, the output voltage and/or output current of the power supply device, to adjust the transmit power of the second wireless transmitter circuit.

In some embodiments, operation S306 includes: based on the charging information, adjusting the operating frequency and/or the duty cycle of the electromagnetic signal of each of the first wireless transmitter circuit and the second wireless transmitter circuit; alternatively, based on the charging information, adjusting the operating frequency and/or the duty cycle of the electromagnetic signal of the first wireless transmitter circuit; alternatively, based on the charging information, adjusting the operating frequency and/or the duty cycle of the electromagnetic signal of the second wireless transmitter circuit.

In some embodiments, the charging information further includes temperature information. The temperature information includes at least one of: the temperature of the battery, the maximum temperature of the back case of the to-be-charged device, and the temperatures at various preset positions of the to-be-charged device. Operation S306 includes: based on the temperature information, adjusting the operating frequency and/or the duty cycle of the electromagnetic signal of each of the first wireless transmitter circuit and the second wireless transmitter circuit; alternatively, based on the temperature information, adjusting the operating frequency and/or the duty cycle of the electromagnetic signal of the first wireless transmitter circuit; alternatively, based on the temperature information, adjusting the operating frequency and/or the duty cycle of the electromagnetic signal of the second wireless transmitter circuit.

In some embodiments, operation S306 includes: based on the charging information, requesting the power supply device to provide a corresponding output voltage, to adjust the transmit power of the first wireless transmitter circuit and/or the transmit power of the second wireless transmitter circuit.

In some embodiments, the charging information includes an adjustment instruction configured to instruct the wireless charging device to adjust the transmit power of the first wireless transmitter circuit and/or the transmit power of the second wireless transmitter circuit. Operation S306 includes: adjusting, based on the adjustment instruction, the transmit power of the first wireless transmitter circuit and/or the transmit power of the second wireless transmitter circuit; or, stopping charging the to-be-charged device based on the adjustment instruction.

FIG. 16 is a flowchart of still yet another wireless charging method provided by an exemplary embodiment of the present disclosure. For example, the method can be implemented by the to-be-charged device provided by the above embodiments.

Referring to FIG. 16, the wireless charging method 50 includes operations as follows.

In operation S502, in different charging modes, the electromagnetic signal transmitted by the wireless charging device is received by the first wireless receiver circuit of the to-be-charged device, and/or the electromagnetic signal transmitted by the wireless charging device is received by the second wireless receiver circuit of the to-be-charged device.

In different charging modes, the charging power provided to the battery is different.

In some embodiments, the charging mode includes a first charging mode and a second charging mode. The charging power provided to the battery in the first charging mode is higher than the charging power provided to the battery in the second charging mode.

In some embodiments, operation S502 may include: in the first charging mode, charging the battery through both the first wireless receiver circuit and the second wireless receiver circuit.

In some embodiments, operation S502 may include: in the second charging mode, charging the battery through the first wireless receiver circuit or the second wireless receiver circuit.

In operation S504, the electromagnetic signals are each converted into a charging current for charging the battery of the to-be-charged device.

In some embodiments, when the battery is charged through the first wireless receiver circuit and the second wireless receiver circuit simultaneously, before operation S504, the method 50 may further include: converting, through the first voltage conversion circuit of the to-be-charged device, the charging voltage and/or charging current output by the first wireless receiver circuit; and converting, through the second voltage conversion circuit of the to-be-charged device, the charging voltage and/or charging current output by the second wireless receiver circuit.

In some embodiments, when the battery is charged through the first wireless receiver circuit or the second wireless receiver circuit, that is, when the battery is charged through only one of the first wireless receiver circuit and the second wireless receiver circuit, before operation S504, the method 50 may further include: converting, through the first voltage conversion circuit, the charging voltage and/or charging current output by the first wireless receiver circuit; or converting, through the second voltage conversion circuit, the charging voltage and/or charging current output by the second wireless receiver circuit.

In some embodiments, when the battery is charged through the first wireless receiver circuit or the second wireless receiver circuit, that is, when the battery is charged through only one of the first wireless receiver circuit and the second wireless receiver circuit, before operation S504, the method 50 may further include: converting, through the third voltage conversion circuit of the to-be-charged device, the charging voltage and/or the charging current output by the first wireless receiver circuit or the second wireless receiver circuit.

In some embodiments, the method 50 may further include: controlling the first wireless receiver circuit or the second wireless receiver circuit to charge the battery, in response to detecting that the wireless charging device includes only one wireless transmitter circuit.

In the wireless charging method provided by the embodiments of the present disclosure, in different charging modes, different numbers of wireless charging channels can be used to wirelessly charge the to-be-charged device. When multiple wireless charging channels are used for the wireless charging, the wireless charging power can be greatly improved (for example, when two wireless charging channels are used, the charging power can be almost doubled; when three wireless charging are used, the charging power can be almost three times that of using a single channel, and so on), thereby speeding up the charging of the battery.

FIG. 17 is a flowchart of still yet another wireless charging method provided by an exemplary embodiment of the present disclosure. Compared with the wireless charging method 50 shown in FIG. 16, the wireless charging method 60 shown in FIG. 17 may further include operations as follows.

In operation S506, the charging information of the to-be-charged device is transmitted to the wireless charging device.

In some embodiments, the charging information includes: the output voltage and/or output current of the first wireless receiver circuit, and the output voltage and/or output current of the second wireless receiver circuit.

In some embodiments, operation S506 may include: transmitting, through the first wireless receiver circuit, the output voltage and/or output current of the first wireless receiver circuit to the wireless charging device, and transmitting, through the second wireless receiver circuit, the output voltage and/or output current of the second wireless receiver circuit to the wireless charging device; alternatively, transmitting, through one of the first wireless receiver circuit and the second wireless receiver circuit, the output voltage and/or output current of the first wireless receiver circuit and the output voltage and/or output current of the second wireless receiver circuit to the wireless charging device.

In some embodiments, the charging information further includes temperature information. The temperature information includes at least one of: the temperature of the battery, the maximum temperature of the back case of the to-be-charged device, and the temperatures at different preset positions of the to-be-charged device.

In some embodiments, operation S506 may include: transmitting, through one of the first wireless receiver circuit and the second wireless receiver circuit, the temperature information to the wireless charging device.

In some embodiments, the method 60 further includes: determining, based on the charging information of the to-be-charged device, an adjustment instruction for the wireless charging device; and controlling the to-be-charged device to transmit the adjustment instruction to the wireless charging device. The adjustment instruction is configured to instruct the wireless charging device to increases or decreases the transmit power of each of the wireless transmitter circuits in the wireless charging device, or the adjustment instruction is configured to instruct the wireless charging device to stop charging when an abnormality occurs in the charging, where the abnormality includes for example overcurrent of the charging current, overvoltage, and abnormal heating.

FIG. 18 is a flowchart of still yet another wireless charging method provided by an exemplary embodiment of the present disclosure. For example, the method may be implemented by the wireless charging device provided in the above-mentioned embodiments.

Referring to FIG. 18, the wireless charging method 70 includes operations as follows.

In operation S702, in different charging modes of the to-be-charged device, the electric energy input from the power supply device is converted, through the first wireless transmitter circuit and/or the second wireless transmitter circuit of the wireless charging device, into an electromagnetic signal for transmission, and wirelessly charge the to-be-charged device.

In different charging modes, the charging power output by the wireless charging device is different.

In some embodiments, the charging modes include a first charging mode and a second charging mode. The charging power output by the wireless charging device in the first charging mode is higher than the charging power output by the wireless charging device in the second charging mode.

In some embodiments, operation S702 includes: in the first charging mode, transmitting the electromagnetic signal through both the first wireless transmitter circuit and the second wireless transmitter circuit.

In some embodiments, operation S702 includes: in the second charging mode, transmitting the electromagnetic signal through the first wireless transmitter circuit or the second transmitter circuit.

In the wireless charging method provided by the embodiments of the present disclosure, in different charging modes, different numbers of wireless charging channels can be used to wirelessly charge the to-be-charged device. When multiple wireless charging channels are used for the wireless charging, the wireless charging power can be greatly improved (for example, when two wireless charging channels are used, the charging power can be almost doubled; when three wireless charging are used, the charging power can be almost three times that of using a single channel, and so on), thereby speeding up the charging of the battery.

FIG. 19 is a flowchart of still yet another wireless charging method provided by an exemplary embodiment of the present disclosure. Different from the wireless charging method 70 shown in FIG. 18, the wireless charging method 80 shown in FIG. 19 may further include operations as follows.

In operation S704, the charging information sent from the to-be-charged device is received.

In some embodiments, the charging information includes: the output voltage and/or output current of the first wireless receiver circuit of the to-be-charged device, the first wireless receiver circuit matching the first wireless transmitter circuit; and the output voltage and/or output current of the second wireless transmitter circuit of the to-be-charged device, the second wireless transmitter circuit matching the second wireless transmitter circuit.

In operation S706, based on the charging information, the transmit power of the first wireless transmitter circuit and/or the transmit power of the second wireless transmitter circuit is adjusted.

In some embodiments, operation S706 includes: based on the charging information, converting, through the voltage conversion circuit of the wireless charging device, the output voltage and/or output current of the power supply device, so as to adjust the transmit power of the first wireless transmitter circuit and/or the transmit power of the second wireless transmitter circuit.

In some embodiments, operation S706 includes: based on the output voltage and/or output current of the first wireless receiver circuit, converting, through the first voltage conversion circuit of the wireless charging device, the output voltage and/or output current of the power supply device, to adjust the transmit power of the first wireless transmitter circuit; and based on the output voltage and/or output current of the second wireless receiver circuit, converting, through the second voltage conversion circuit of the wireless charging device, the output voltage and/or output current of the power supply device, to adjust the transmit power of the second wireless transmitter circuit.

In some embodiments, the charging information further includes temperature information. The temperature information includes at least one of: the temperature of the battery, the maximum temperature of the back case of the to-be-charged device, and the temperatures at various preset positions of the to-be-charged device. Operation S706 includes: based on the temperature information, converting, through the first voltage conversion circuit, the output voltage and/or output current of the power supply device, to adjust the transmit power of the first wireless transmitter circuit; and based on the temperature information, converting, through the second voltage conversion circuit, the output voltage and/or output current of the power supply device, to adjust the transmit power of the second wireless transmitter circuit.

In some embodiments, operation S706 includes: based on the charging information, adjusting the operating frequency and/or the duty cycle of the electromagnetic signal of each of the first wireless transmitter circuit and the second wireless transmitter circuit; alternatively, based on the charging information, adjusting the operating frequency and/or the duty cycle of the electromagnetic signal of the first wireless transmitter circuit; alternatively, based on the charging information, adjusting the operating frequency and/or the duty cycle of the electromagnetic signal of the second wireless transmitter circuit.

In some embodiments, the charging information further includes temperature information. The temperature information includes at least one of: the temperature of the battery, the maximum temperature of the back case of the to-be-charged device, and the temperatures at various preset positions of the to-be-charged device. Operation S706 includes: based on the temperature information, adjusting the operating frequency and/or the duty cycle of the electromagnetic signal of each of the first wireless transmitter circuit and the second wireless transmitter circuit; alternatively, based on the temperature information, adjusting the operating frequency and/or the duty cycle of the electromagnetic signal of the first wireless transmitter circuit; alternatively, based on the temperature information, adjusting the operating frequency and/or the duty cycle of the electromagnetic signal of the second wireless transmitter circuit.

It should be noted that the above-mentioned drawings are only schematic illustrations of the processes included in the methods according to the exemplary embodiments of the present disclosure, and are not intended to be limiting. It is easy to understand that the processes shown in the above figures do not indicate or limit the chronological order of these processes. In addition, it is also readily understood that these processes may be performed synchronously or asynchronously in multiple modules, for example.

As will be appreciated by those skilled in the art, various aspects of the present disclosure may be implemented as a system, method or program product. Accordingly, various aspects of the present disclosure may be embodied as a combination of hardware and software aspects, which may be collectively referred to herein as a "circuit", "module", or "system".

In some exemplary embodiments of the present disclosure, there is also provided a computer-readable storage medium on which a program product capable of implementing the above-described methods of the present disclosure is stored. In some possible implementations, various aspects of the present disclosure may also be implemented in the form of a program product including program codes, where when the program product is run on a terminal device, the program codes cause the terminal device to perform the operations according to various exemplary embodiments of the present disclosure described in the above-mentioned "exemplary methods" of this specification.

The program codes embodied on the readable medium may be transmitted using any suitable medium, including but not limited to being transmitted wirelessly, through a wired line, an optical fiber cable, RF, or any suitable combination of thereof.

It should be noted that, although several modules or units of the apparatus for performing actions are mentioned in the above detailed description, such division is not mandatory. Indeed, according to the embodiments of the present disclosure, the features and functions of two or more modules or units described above may be embodied in one module or unit. Similarly, the features and functions of one module or unit described above may be further divided into multiple modules or units.

Additionally, although the various operations of the methods of the present disclosure are depicted in the figures in a particular order, this does not require or imply that the operations must be performed in the particular order or that all the illustrated operations must be performed to achieve the desired result. Additionally or alternatively, certain operations may be omitted, multiple operations may be combined into one operation, and/or one operation may be divided into multiple operations.

Other embodiments of the present disclosure will be readily conceived by those skilled in the art upon consideration of the specification and practice of the invention disclosed herein. This disclosure is intended to cover any variations, uses, or adaptations of this disclosure that follow the general principle of this disclosure and include common general knowledge or means in the technical field not disclosed by this disclosure. The specification and embodiments are exemplary only, and the true scope and spirit of the disclosure are subject to the appended claims.

What is claimed is:

1. A to-be-charged device, comprising:
    a battery;
    at least two wireless receiver circuits each coupled to the battery, wherein each of the at least two wireless receiver circuits is configured to receive an electromagnetic signal transmitted by a wireless charging device, and convert the electromagnetic signal into a charging voltage and a charging current for charging the battery; and
    a control circuit coupled to each of the at least two wireless receiver circuits, wherein the control circuit is configured to, in various charging stages, control at least one of the at least two wireless receiver circuits to charge the battery;
    wherein the at least two wireless receiver circuits comprise a first wireless receiver circuit and a second wireless receiver circuit; and
    wherein the charging stages comprise at least one of a constant current charging stage, a constant voltage charging stage and a trickle charging stage;
    wherein the to-be-charged device further comprises a first voltage conversion circuit, a second voltage conversion circuit and a third voltage conversion circuit; the first voltage conversion circuit is coupled between the first wireless receiver circuit and the battery; the second voltage conversion circuit is coupled between the second wireless receiver circuit and the battery; and the third voltage conversion circuit is coupled between the first wireless receiver circuit and the battery;
    wherein the control circuit is further configured to, in the constant current charging stage, control the first voltage conversion circuit to convert at least one of a charging voltage and a charging current output by the first wireless receiver circuit, and control the second voltage conversion circuit to convert at least one of a charging voltage and a charging current output by the second wireless receiver circuit; and
    wherein the control circuit is further configured to, in at least one of the trickle charging stage and the constant voltage charging stage, control the third voltage conversion circuit to convert at least one of the charging voltage and the charging current output by the first wireless receiver circuit.

2. The to-be-charged device as claimed in claim 1, wherein;
    the control circuit is configured to, in the constant current charging stage, control both the first wireless receiver circuit and the second wireless receiver circuit to charge the battery; and
    the control circuit is further configured to, in at least one of the trickle charging stage and the constant voltage charging stage, control the first wireless receiver circuit to charge the battery.

3. The to-be-charged device as claimed in claim 1, wherein the control circuit is further configured to: control the first wireless receiver circuit or the second wireless receiver circuit to charge the battery, when it is detected that the wireless charging device comprises only one wireless transmitter circuit.

4. The to-be-charged device as claimed in claim 3, wherein the control circuit is further configured to: control the third voltage conversion circuit to convert at least one of a charging voltage and a charging current output by the first wireless receiver circuit, when the wireless charging device comprises only one wireless transmitter circuit.

5. The to-be-charged device as claimed in claim 1, wherein the control circuit is further configured to control the to-be-charged device to transmit charging information of the to-be-charged device to the wireless charging device.

6. The to-be-charged device as claimed in claim 5, wherein the charging information comprises: at least one of an output voltage and an output current of the first wireless receiver circuit, and at least one of an output voltage and an output current of the second wireless receiver circuit; and the control circuit is further configured to: control the first wireless receiver circuit to transmit the at least one of the output voltage and the output current of the first wireless receiver circuit to the wireless charging device, and control the second wireless receiver circuit to transmit the at least one of the output voltage and the output current of the second wireless receiver circuit to the wireless charging device; or, the control circuit is further configured to control one of the at least two wireless receiver circuits to transmit, to the wireless charging device, the at least one of the output voltage and the output current of the first wireless receiver circuit and the at least one of the output voltage and the output current of the second wireless receiver circuit; and wherein the charging information further comprises temperature information, and the temperature information comprises at least one of: a temperature of the battery, a maximum temperature of a back case of the to-be-charged device, and temperatures at different preset positions of the to-be-charged device; and the control circuit is further configured to control one of the at least two wireless receiver circuits to transmit the temperature information to the wireless charging device.

7. The to-be-charged device as claimed in claim 1, wherein the control circuit is further configured to: determine, based on charging information of the to-be-charged device, an adjustment instruction for the wireless charging device; and control the to-be-charged device to transmit the adjustment instruction to the wireless charging device;

wherein the adjustment instruction is configured to instruct the wireless charging device to increase or decrease a transmit power of each wireless transmitter circuit in the wireless charging device, or the adjustment instruction is configured to instruct the wireless charging device to stop charging.

8. The to-be-charged device as claimed in claim 1, wherein the first wireless receiver circuit comprises a first receiver coil and a first AC/DC conversion circuit coupled to the first receiver coil, the first wireless receiver circuit is configured to convert, through the first receiver coil, the received electromagnetic signal into a first alternating current, and convert, through the first AC/DC conversion circuit, the first alternating current into a direct current;

the second wireless receiver circuit comprises a second receiver coil and a second AC/DC conversion circuit coupled to the second receiver coil, and the second wireless receiver circuit is configured to convert, through the second receiver coil, the received electromagnetic signal into a second alternating current, and convert, through the second AC/DC conversion circuit, the second alternating current into a direct current; and wherein the first receiver coil and the second receiver coil are arranged in a same plane of the to-be-charged device.

9. A wireless charging method, implemented by a to-be-charged device, the to-be-charged device comprising a battery, at least two wireless receiver circuits each coupled to the battery, and a control circuit coupled to each of the at least two wireless receiver circuits, and the method comprising:

in various charging stages, controlling, through the control circuit, at least one of the at least two wireless receiver circuits to receive an electromagnetic signal transmitted from a wireless charging device; and converting, through the at least one of the at least two wireless receiver circuits, the received electromagnetic signal into a charging current for charging the battery of the to-be-charged device;

wherein the at least two wireless receiver circuits comprise a first wireless receiver circuit and a second wireless receiver circuit; the to-be-charged device further comprises a first voltage conversion circuit, a second voltage conversion circuit and a third voltage conversion circuit; the first voltage conversion circuit is coupled between the first wireless receiver circuit and the battery; the second voltage conversion circuit is coupled between the second wireless receiver circuit and the battery; and the third voltage conversion circuit is coupled between the first wireless receiver circuit and the battery;

wherein the method further comprises:

controlling the third voltage conversion circuit to convert at least one of a charging voltage and a charging current output by the first wireless receiver circuit to charge the battery, in response to the wireless charging device comprising only one wireless transmitter circuit.

10. The method as claimed in claim 9, wherein the charging stages comprise a constant current charging stage, and controlling, through the control circuit, at least one of the at least two wireless receiver circuits to receive the electromagnetic signal transmitted from the wireless charging device, comprises:

in the constant current charging stage, controlling, through the control circuit, both the first wireless receiver circuit and the second wireless receiver circuit to receive the electromagnetic signal transmitted from the wireless charging device, so as to charge, through both the first wireless receiver circuit and the second wireless receiver circuit, the battery of the to-be-charged device.

11. The method as claimed in claim 10, wherein in the constant current charging stage, the method further comprises:

converting, through the first voltage conversion circuit, at least one of a charging voltage and a charging current output by the first wireless receiver circuit; and converting, through the second voltage conversion circuit, at least one of a charging voltage and a charging current output by the second wireless receiver circuit.

12. The method as claimed in claim 10, wherein the charging stages further comprise at least one of a trickle charging stage and a constant voltage charging stage, and controlling, through the control circuit, at least one of the at least two wireless receiver circuits to receive the electromagnetic signal transmitted from the wireless charging device in the various charging stages, comprises:

in the at least one of the trickle charging stage and the constant voltage charging stage, controlling, through the control circuit, the first wireless receiver circuit or the second wireless receiver circuit to receive the electromagnetic signal transmitted from the wireless charging device, so as to charge the battery through the first wireless receiver circuit or the second wireless receiver circuit which receives the electromagnetic signal.

13. The method as claimed in claim 12, wherein in the at least one of the trickle charging stage and the constant voltage charging stage, the method further comprises:

converting, through the first voltage conversion circuit, at least one of a charging voltage and a charging current output by the first wireless receiver circuit; or converting, through the second voltage conversion circuit, at least one of a charging voltage and a charging current output by the second wireless receiver circuit; or converting, through the third voltage conversion circuit, at least one of a charging voltage and a charging current output by the first wireless receiver circuit or the second wireless receiver circuit.

14. The method as claimed in claim 9, further comprising:
transmitting charging information of the to-be-charged device to the wireless charging device;
wherein the charging information comprises: at least one of an output voltage and an output current of the first wireless receiver circuit, and at least one of an output voltage and an output current of the second wireless receiver circuit; and the transmitting charging information of the to-be-charged device to the wireless charging device, comprises:
transmitting, though the first wireless receiver circuit, the at least one of the output voltage and the output current of the first wireless receiver circuit to the wireless charging device, and transmitting, through the second wireless receiver circuit, the at least one of the output voltage and the output current of the second wireless receiver circuit to the wireless charging device; or
transmitting, though one of the first wireless receiver circuit and the second wireless receiver circuit, the at least one of the output voltage and the output current of the first wireless receiver circuit and the at least one of the output voltage and the output current of the second wireless receiver circuit to the wireless charging device.

15. The method as claimed in claim 14, wherein the charging information further comprises temperature information, and the temperature information comprises at least one of: a temperature of the battery, a maximum temperature of a back case of the to-be-charged device, and temperatures at various preset positions of the to-be-charged device; and the transmitting charging information of the to-be-charged device to the wireless charging device further comprises:
transmitting, though one of the first wireless receiver circuit and the second wireless receiver circuit, the temperature information to the wireless charging device.

16. The method as claimed in claim 9, further comprising:
determining an adjustment instruction for the wireless charging device, based on charging information of the to-be-charged device; and
controlling the to-be-charged device to transmit the adjustment instruction to the wireless charging device;
wherein the adjustment instruction is configured to instruct the wireless charging device to increase or decrease a transmit power of each wireless transmitter circuit of the wireless charging device; or, the adjustment instruction is configured to instruct the wireless charging device to stop charging.

17. A to-be-charged device, comprising:
a battery;
at least two wireless receiver circuits each coupled to the battery, wherein each of the at least two wireless receiver circuits is configured to receive an electromagnetic signal transmitted by a wireless charging device, and convert the electromagnetic signal into a charging voltage and a charging current for charging the battery; and
a control circuit coupled to each of the at least two wireless receiver circuits, wherein the control circuit is configured to, in various charging stages, control at least one of the at least two wireless receiver circuits to charge the battery;
wherein the at least two wireless receiver circuits comprise a first wireless receiver circuit and a second wireless receiver circuit; and
wherein the charging stages comprise at least one of a constant current charging stage, a trickle charging stage and a constant voltage charging stage;
wherein the control circuit is configured to, in the constant current charging stage, control both the first wireless receiver circuit and the second wireless receiver circuit to charge the battery; and
wherein the control circuit is further configured to, in at least one of the trickle charging stage and the constant voltage charging stage, control the first wireless receiver circuit or the second wireless receiver circuit to charge the battery.

18. The to-be-charged device as claimed in claim 17, wherein the to-be-charged device further comprises a first voltage conversion circuit, a second voltage conversion circuit and a third voltage conversion circuit; the first voltage conversion circuit is coupled between the first wireless receiver circuit and the battery; the second voltage conversion circuit is coupled between the second wireless receiver circuit and the battery; and the third voltage conversion circuit is coupled between the first wireless receiver circuit and the battery;
wherein the control circuit is further configured to, in the constant current charging stage, control the first voltage conversion circuit to convert at least one of a charging voltage and a charging current output by the first wireless receiver circuit, and control the second voltage conversion circuit to convert at least one of a charging voltage and a charging current output by the second wireless receiver circuit; and
wherein the control circuit is further configured to, in at least one of the trickle charging stage and the constant voltage charging stage, control the third voltage conversion circuit to convert at least one of the charging voltage and the charging current output by the first wireless receiver circuit.

19. The to-be-charged device as claimed in claim 17, further comprising: a first voltage conversion circuit, a second voltage conversion circuit and a third voltage conversion circuit;
wherein the first voltage conversion circuit is coupled between the first wireless receiver circuit and the battery; the second voltage conversion circuit is coupled between the second wireless receiver circuit and the battery; and the third voltage conversion circuit is coupled between the first wireless receiver circuit and the battery; and
wherein the control circuit is further configured to: control the third voltage conversion circuit to convert at least one of a charging voltage and a charging current output by the first wireless receiver circuit to charge the battery, when it is detected that the wireless charging device comprises only one wireless transmitter circuit.

20. The to-be-charged device as claimed in claim 17, wherein the control circuit is further configured to control the to-be-charged device to transmit charging information of the to-be-charged device to the wireless charging device, and the charging information comprises: at least one of an output voltage and an output current of the first wireless receiver circuit, and at least one of an output voltage and an output current of the second wireless receiver circuit.

* * * * *